United States Patent [19]
Sage

[11] Patent Number: 5,633,574
[45] Date of Patent: May 27, 1997

[54] PULSE-CHARGE BATTERY CHARGER

[76] Inventor: George E. Sage, 22002 Redmond-Fall City Rd., Redmond, Wash. 98053

[21] Appl. No.: 154,598

[22] Filed: Jan. 18, 1994

[51] Int. Cl.⁶ .............................. H02J 7/00; H01M 10/46
[52] U.S. Cl. ........................ 320/21; 320/4; 320/35
[58] Field of Search .................... 320/4, 20, 21, 320/35

[56] References Cited

U.S. PATENT DOCUMENTS

| | | | |
|---|---|---|---|
| 3,454,859 | 7/1969 | Ford et al. | 320/6 |
| 3,517,293 | 6/1970 | Burkett et al. | 320/14 |
| 3,559,025 | 1/1971 | Burkett et al. | 320/14 |
| 3,597,673 | 8/1971 | Burkett et al. | 320/5 |
| 3,609,503 | 9/1971 | Burkett et al. | 320/5 |
| 3,614,582 | 10/1971 | Burkett et al. | 320/5 |
| 3,614,583 | 10/1971 | Burkett et al. | 320/5 |
| 3,614,584 | 10/1971 | Burkett et al. | 320/35 |
| 3,617,851 | 11/1971 | Du Puy et al. | 320/22 |
| 3,622,857 | 11/1971 | Sethi | 320/14 |
| 3,626,270 | 12/1971 | Burkett et al. | 320/35 |
| 3,683,256 | 8/1972 | Mas | 320/14 |
| 3,700,997 | 10/1972 | Smith | 320/20 |
| 3,732,481 | 5/1973 | Mas | 320/14 |
| 3,816,806 | 6/1974 | Mas | 320/20 |
| 4,211,969 | 7/1980 | Steigerwald | 320/14 |
| 4,302,714 | 11/1981 | Yefsky | 320/5 |
| 4,342,954 | 8/1982 | Griffith | 320/14 |
| 4,385,269 | 5/1983 | Aspinwall et al. | 320/14 |
| 4,549,127 | 10/1985 | Taylor et al. | 320/21 |
| 4,609,860 | 9/1986 | Fasen | 320/14 |
| 4,616,171 | 10/1986 | Hernandez et al. | 320/30 |
| 4,622,507 | 11/1986 | Persen | 320/2 |
| 4,731,573 | 3/1988 | Sexton et al. | 320/14 |
| 4,746,852 | 5/1988 | Martin | 320/20 |
| 4,755,733 | 7/1988 | Laliberté | 320/15 |
| 4,829,225 | 5/1989 | Podrazhansky et al. | 320/14 |
| 4,878,007 | 10/1989 | Gábor et al. | 320/14 |
| 5,057,381 | 10/1991 | Persen | 429/7 |
| 5,159,258 | 10/1992 | Kolvites et al. | 320/14 |
| 5,182,509 | 1/1993 | Simmonds | 320/14 |
| 5,196,779 | 3/1993 | Alexanders et al. | 320/14 |
| 5,200,689 | 4/1993 | Interiano et al. | 320/20 |
| 5,223,780 | 6/1993 | Hu | 320/14 |
| 5,256,955 | 10/1993 | Tomura et al. | 320/2 |
| 5,291,118 | 3/1994 | Kojima | 320/35 |
| 5,349,282 | 9/1994 | McClure | 320/32 |
| 5,357,185 | 10/1994 | Chen | 320/2 |

OTHER PUBLICATIONS

One Page Entitled "Unwanted Memory Spooks Nickel-Cadmium Cells" Written by Saverlo F. Pensabene & James W. Gould II c/o General Electric Co.
Integrated Circuit Systems, Inc. ICS1700A–Quick Saver II™ Controller For Nickel–Cadmium Batteries–18 Pages.

Primary Examiner—Robert Nappi
Assistant Examiner—Patrick B. Law
Attorney, Agent, or Firm—Roy E. Mattern, Jr.

[57] ABSTRACT

This pulse-charge battery charger charges Nickel-Cadmium and Nickel-metal hydride batteries having one or more cells and used with cellular telephones and camcorders. A battery is lowered into a finger accessible receiving volume and held by a magnetic force. Charging automatically commences and automatically stops, as controlled by utilizing a U1 controller and other combined circuits. Charging status is indicated by colored lights: yellow—charging; green—battery is charged; orange—battery is overheated and cooling; and red—battery is defective. Other combined circuits are: power supply circuit to receive either 12.6 volt AC or DC voltage power, and to produce both a full wave rectified unregulated DC volt power source, and a regulated 5 DC volt power source; battery installed detector circuit; a reset circuit; a timing control circuit; ready light circuit; no battery then no light circuit; over temperature detection circuit; normalize circuit to accommodate battery cell arrangements; constant current source circuit; discharge control circuit; thermistor sensor control circuit; battery being charged circuit operating when a battery has an internal temperature sensor; and a battery being charged circuit operating when a battery has no temperature sensor, and the charger's external temperature sensor is relied upon. The following cycle, for example, is repeated until a battery is fully charged: 1000 milliseconds of charging; 2 milliseconds of no charging; 5 milliseconds of discharging; 10 milliseconds for a second no charging period.

5 Claims, 15 Drawing Sheets

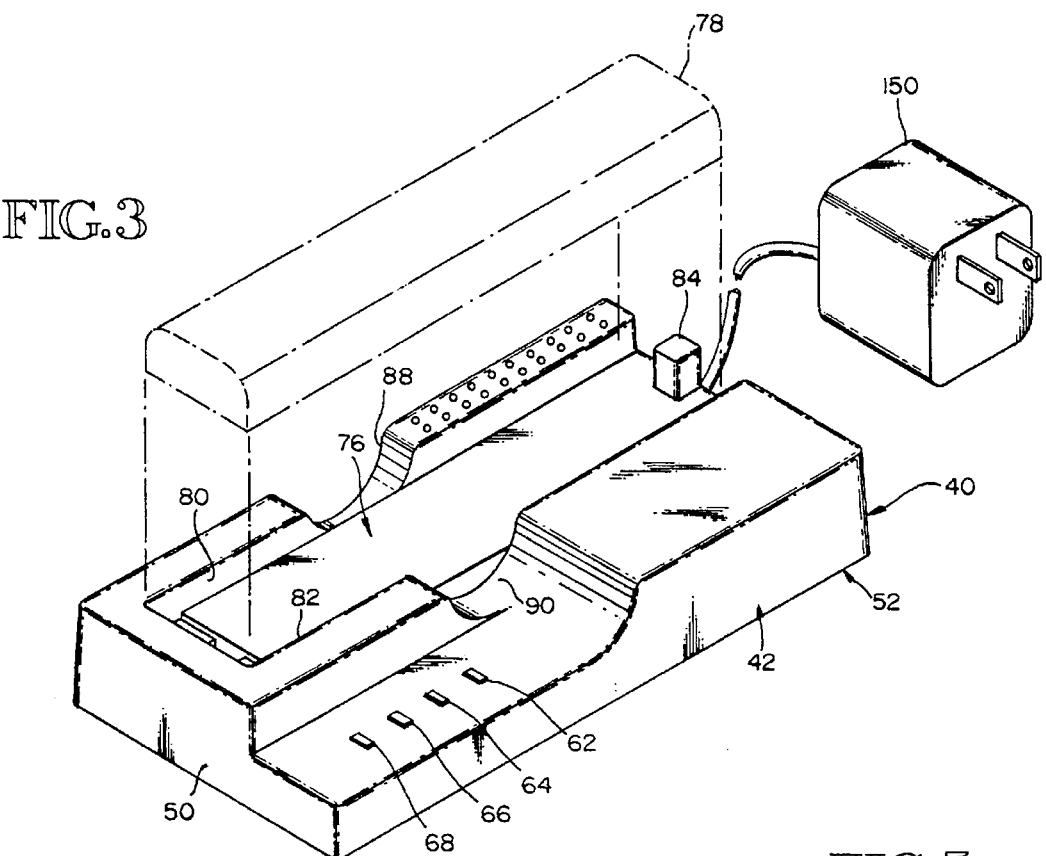
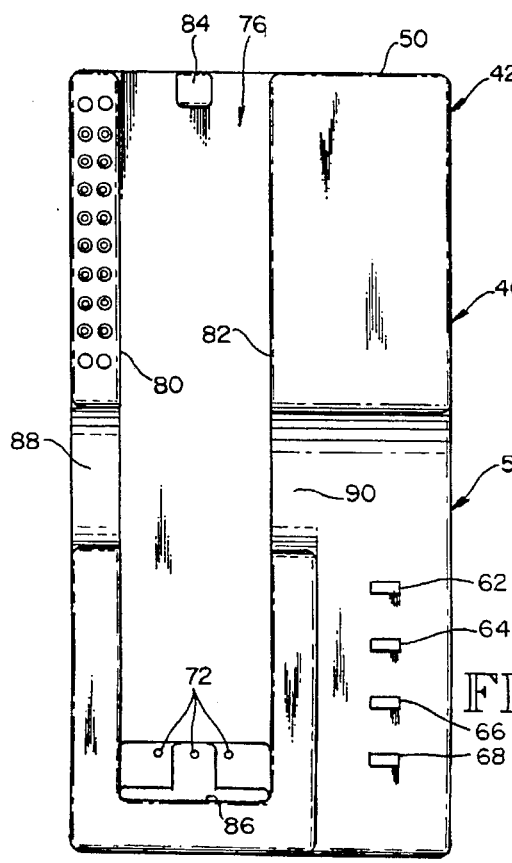
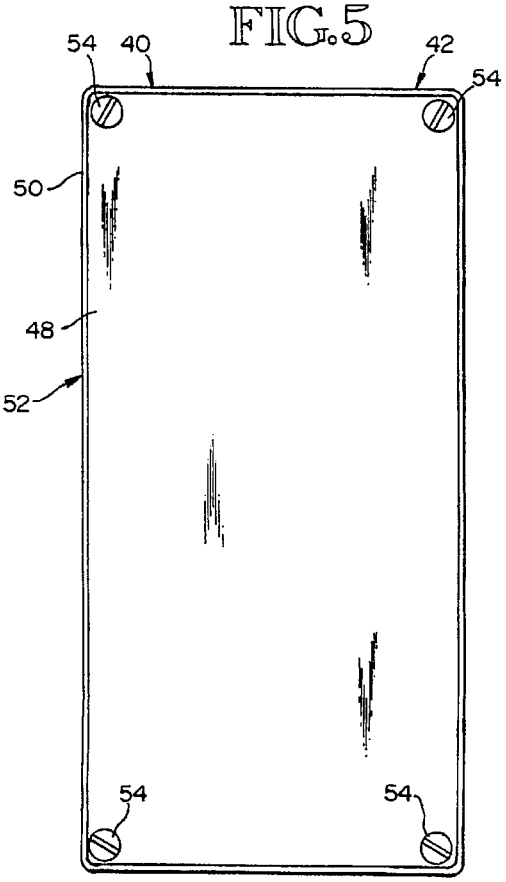

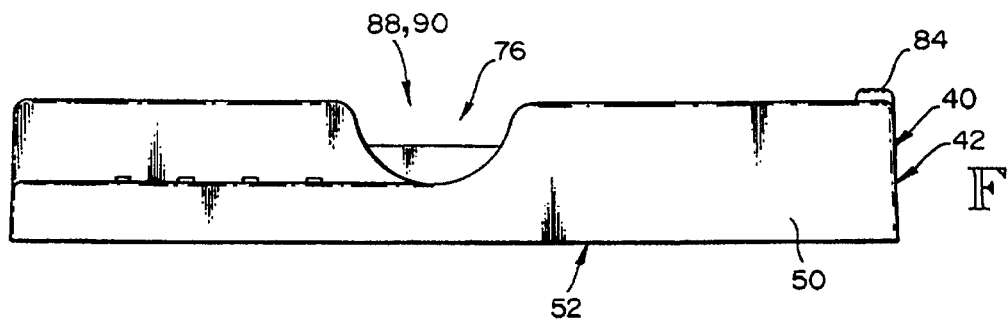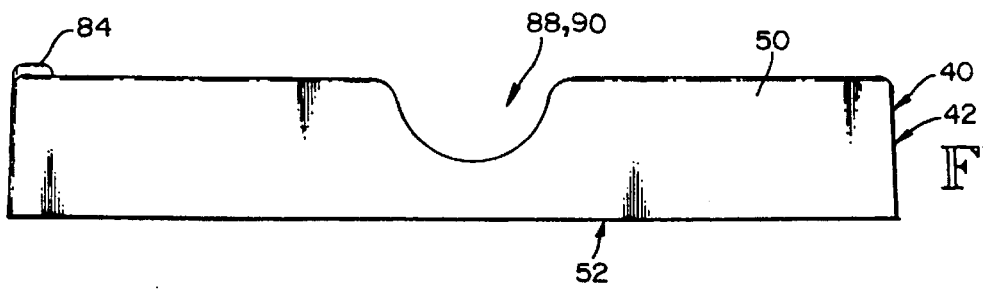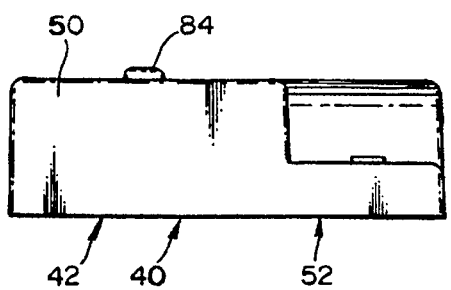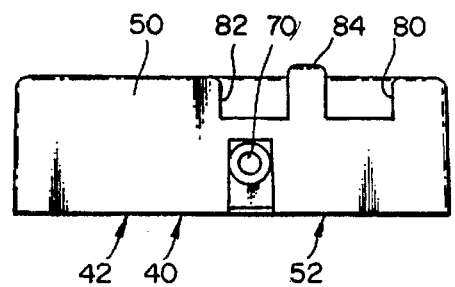

PULSE-CHARGE BATTERY CHARGER

BACKGROUND

Nickel-cadmium batteries are used in cellular telephones, camcorders, razors, power hand tools, power garden tools, temporary lights, clocks, etc. During their recharging an unwanted memory may be created, resulting in a charging period being completed, when the full capacity of the battery is not fully recharged.

Information associated with nickel-cadmium batteries to be read by a user, cautions the user to periodically substantially discharge the battery, and then fully recharge the battery. In addition this information indicates, this sequence may need to be repeated several times, if the unwanted memory is severe, when subsequently attempting to reduce or to eliminate the unwanted memory. During attempts to avoid an unwanted memory, persons using some battery chargers must be very attentive to the battery charger during the charging times.

Since such attention is usually inconvenient and time consuming, and also there is a possibility of damaging the battery, specially designed battery chargers are available, which are more conveniently used to periodically substantially discharge a nickel-cadmium battery. Then after this essentially full discharge, the user tries to fully recharge the battery. The user is either successful, or must try this essentially full discharge procedure again and again until recharging the full capacity of the battery. These battery chargers are either manually operated by manipulating sequencing switches or buttons, or once started, by manipulating a start switch or start button, they automatically charge the battery. However, the batteries must be promptly removed when the battery is fully charged.

Some of the available battery charges have additional circuitry and incorporate a U1 controller, i.e. control circuitry, which charges a nickel-cadmium battery using a pulse-charge battery charging system. These pulse-charge battery chargers eliminate the previously required need for a substantial discharge, essentially a full discharge, before attempting to recharge.

There remained a need for a pulse-charge battery charger, which could automatically and conveniently receive a nickel-cadmium or nickel-metal-hydride battery and keep it in place until the user returned his or her attention to it, and at any time the user could quickly observe the status of the battery charging operation.

SUMMARY

This pulse-charge battery charger is used by persons who just want to conveniently place his or her nickel-cadmium battery, nickel-metal-hydride battery, and/or other batteries, which are used, for example, in respect to cellular phones, camcorders, VCR's, clocks, radios, portable TV's, hand work tools, hand garden tools, etc. and let the charging occur without their monitoring and/or without their operation of buttons or switches. They also do not want to be scheduled to return to the charger to keep the battery from being overcharged. They want their battery charger to start, to run and to stop automatically. Moreover, in specific reference to nickel-cadmium batteries, they want to be sure their battery does not acquire an undesirable memory, creating a false determination that the battery is supposedly fully charged, when the full battery capacity has not been reached.

This pulse-charger battery charger therefore, is ready for their use. The person using this charger lowers his or her battery down into a finger accessible battery receiving volume, having on each side finger receiving recesses. These recesses make the gripping of a charged battery very easy and convenient, when the battery is being removed. Throughout the charging period, the battery is held in place by a magnetic force, created by a magnet, which is centrally located below the bottom of the battery receiving volume.

A person using this pulse-charge battery charger quickly knows the status of the charging operation, upon observing the location on the charger of four colored light sources, which are. preferably four light emitting diodes. When a blinking green light is on, the battery is charged. When a yellow light is on, the battery is charging. When an orange light is on, the battery has overheated and is cooling down. Then a red light is on, the battery is probably defective.

This pulse-charge battery charger, in the circuitry thereof, incorporates a U1 controller, i.e. U1 control circuit, which is the basic control circuitry for the pulse-charge method of charging, that has been used and is being used, especially to charge nickel-cadmium batteries, to overcome any possible undesirable memory of a false fully charged status. Added circuits, electrical and electronic components, indicator lights, a magnet, and an improved housing having the respective finger recesses, have all been combined to provide a person with this pulse-charge battery charger, which automatically starts, continues, and stops the charging of batteries.

In further reference to the improvements made, there is a constant current circuit, which supplies a known current flow of energy at a known voltage to the battery during the charging period, and also a controlled known current flow of energy at a known voltage during the discharge period. Preferably, the discharging current is three times the charging current. Preferably during each needed cycle of pulse-charging, the charging occurs for one thousand milliseconds. Then for two milliseconds, there is a substantially no charging time, when the current is essentially at zero. Thereafter, the discharging occurs for five milliseconds. Then for ten milliseconds there is a second substantially no charging time, when the current is essentially at zero again, during a measuring or reading period regarding the status of the charging operation. Thereafter, this cycle generally repeats in several overall sequences until the battery is fully charged. Any nickel-cadmium batteries so charged, lose any of their possible unwanted memories.

There is a battery installed detector circuit which detects the voltage of a battery, when the battery is placed into the charger. Thereafter the charging of a battery automatically starts.

There is a circuit to detect the presence or absence of a temperature measurement unit which may be inside a battery pack. If the battery has none, then this circuit selects the temperature measurement unit, which is in this pulse-charge battery charger. Thereafter, whichever temperature measurement unit is selected, this circuit is utilized to monitor the temperature during the charging period. If a preselected safe top temperature, such as 130 degrees F. is exceeded, the operation of this circuitry automatically stops the charging, until the temperature drops to another selected temperature, such as 100 degrees F., and then the charging automatically resumes.

These added circuits to the circuitry of the U1 controller, relieve the person who used this pulse-charge battery charger, of any additional operation requirements, beyond just placing his or her battery into this battery charger. These operational capabilities of this battery charger allow the user to place his or her battery into the charger regardless of the battery condition or previous charge history. Moreover, these operational capabilities of this battery charger preclude any possibilities of a memory build up or voltage depression occurring during the charging of the battery. There is no need for undertaking at the outset, any substantial discharging of a battery, or otherwise pre-conditioning a battery, prior to charging the battery using this pulse-charge battery charger.

The force of the magnet not only insures the retention of a battery in this charger, but also insures that all the electrical contacts of the battery and all the oppositely positioned contacts of the charger get into their opposing contacting positions, and so remain during the charging period, and so remain until the battery is conveniently lifted out of this pulse-charge battery charger by the person using this charger. This magnetic force is totally sufficient, so there is no necessity for having any springs to create a holding force, or any mechanical clamps, or other inconvenient or cumbersome battery securement parts or portions.

This pulse-charge battery charger has a power supply capable of receiving the electrical energy of a vehicle's electrical system. Also by using a transformer to reduce higher voltages of electrical power produced by a public utility, or electrical power available via building electrical systems down to the voltage levels used in vehicle electrical systems, this power supply receives either low voltage AC or DC power, so this pulse-charge battery charger is used both in buildings as well as in vehicles. This power supply also produces a regulated five volt power supply which is used substantially throughout the circuitry of this pulse-charge battery charger, to attain excellent control of the charging process.

DRAWINGS

Preferred embodiments of the pulse-charge battery charger are illustrated in the drawings, where:

FIG. 1 is a partial perspective view of the interior of an automobile showing how a pulse-charger battery charger of one embodiment is positioned to receive an elongated battery of a cellular telephone, and to receive charging power via a circuit, in a vehicle;

FIG. 2, similar to FIG. 1, is a partial perspective view of the interior of an automobile showing how a pulse-charger battery charger of another embodiment is positioned to receive a trapezoidal battery of a cellular telephone, and to receive charging power via a circuit in a vehicle;

FIG. 3 is a perspective view of the pulse-charger battery charger shown in FIG. 1, indicating, via phantom lines, the lowering of an elongated battery, and also showing the use of a transformer unit to be connected to the circuit of a building;

FIG. 4 is a top view of the pulse-charger battery charger shown in FIG. 3, showing the set of electrical contacts, vent holes and indicating lights;

FIG. 5 is a bottom view of the pulse-charger battery charger shown in FIG. 3 indicating the fasteners;

FIG. 6 is a right side view of the pulse-charger battery charger shown in FIG. 3;

FIG. 7 is a left side view of the pulse-charger battery charger shown in FIG. 3;

FIG. 8 is a front view of the pulse-charger battery charger shown in FIG. 3;

FIG. 9 is a back view of the pulse-charger battery charger shown in FIG. 3 showing the plug in connection;

Figure 17:
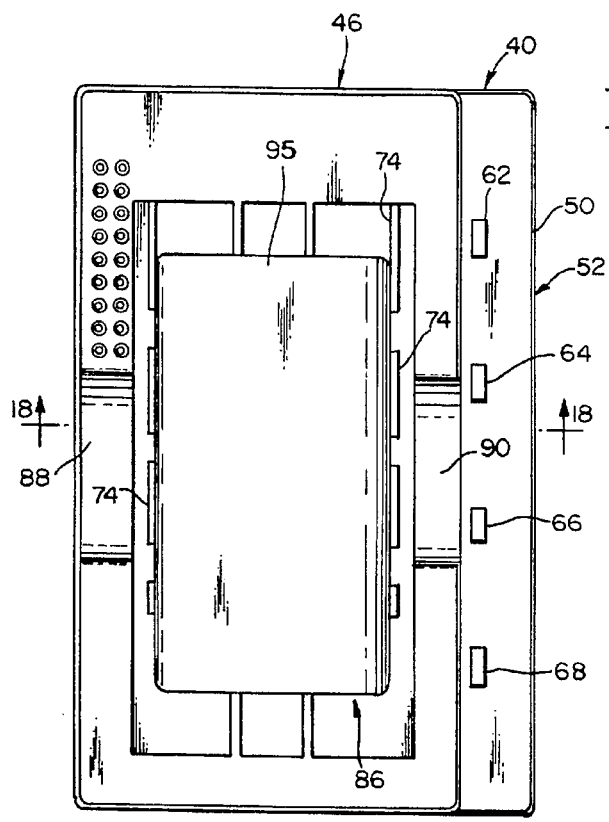
FIG. 17 is a top view of a pulse-charger battery charger in respect to another embodiment arranged with selected spacers to position a smaller battery, and showing vent holes and indicating lights.
Figure 18:
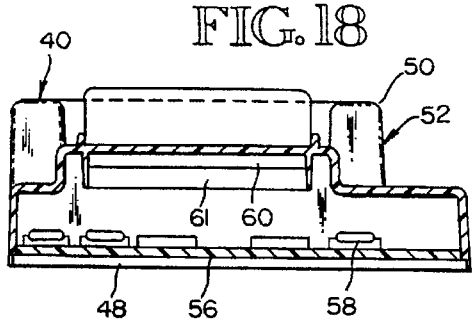
Figure 19:
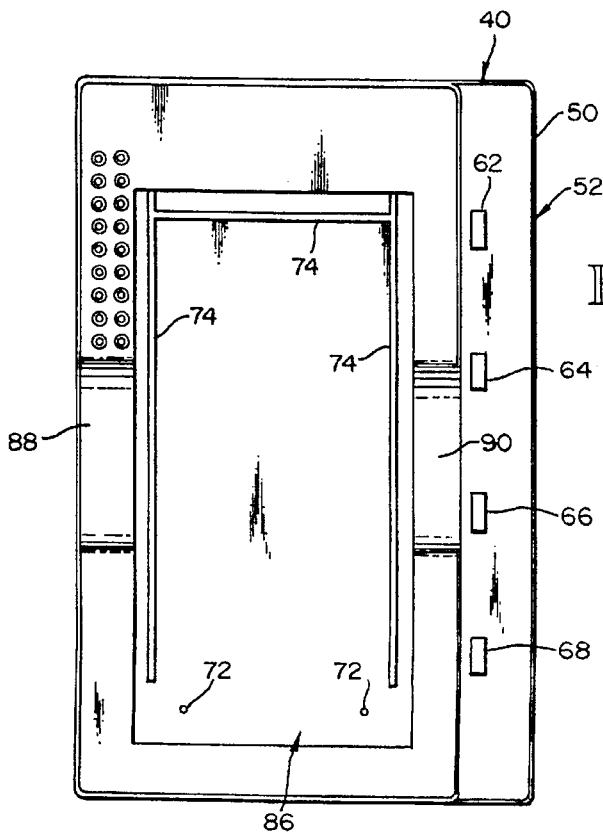
Figure 21:
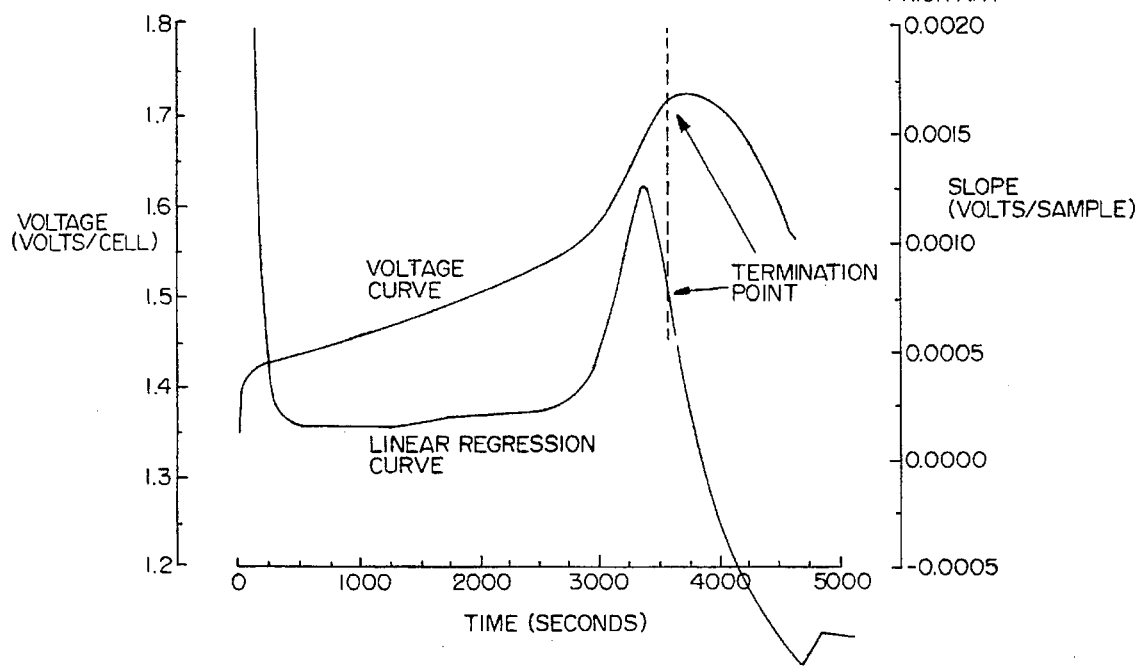
Figure 20:
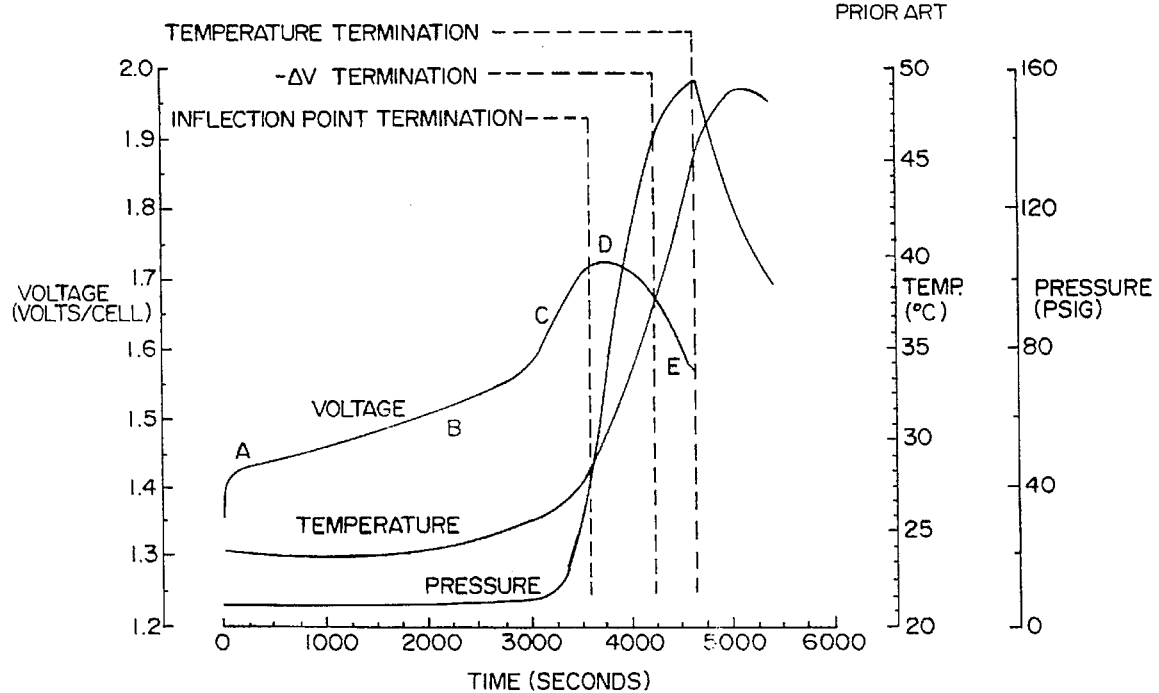
Figure 22:
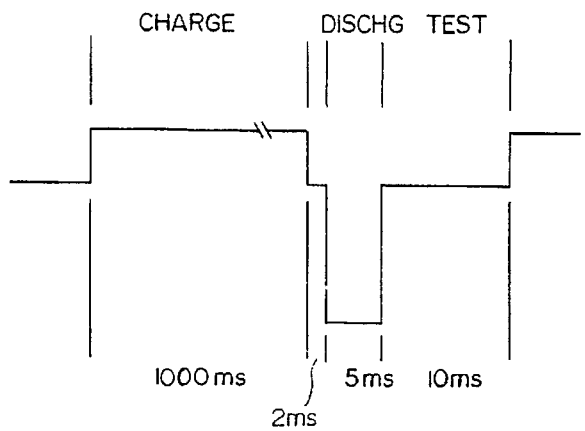
Figure 23:
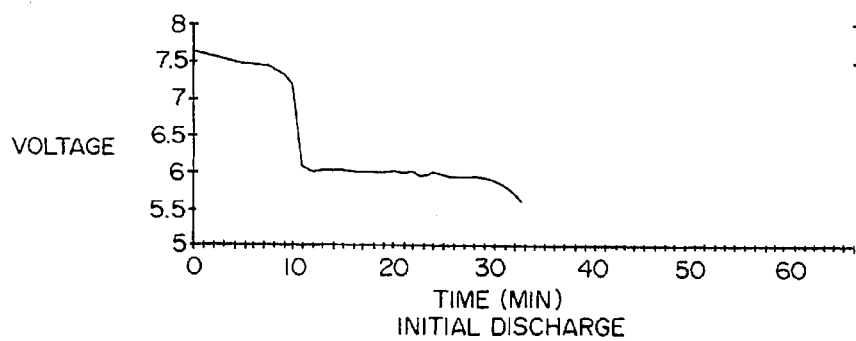
Figure 24:
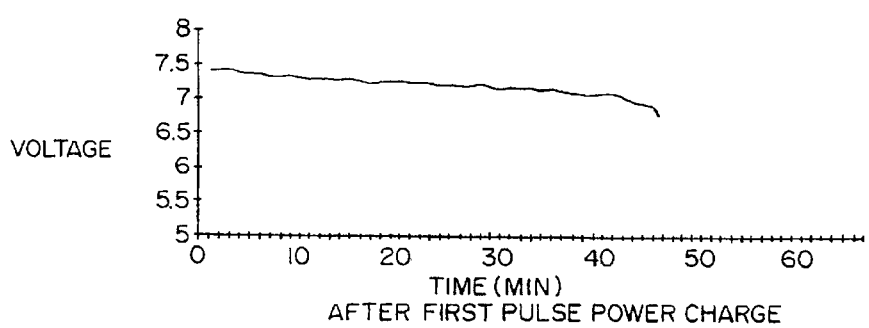
Figure 25:
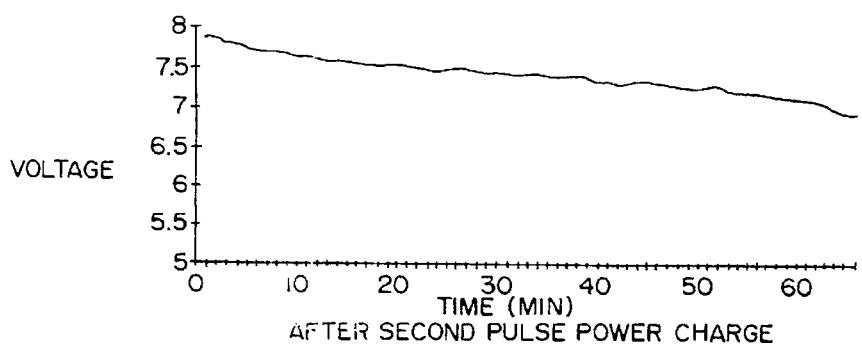
Figure 26:
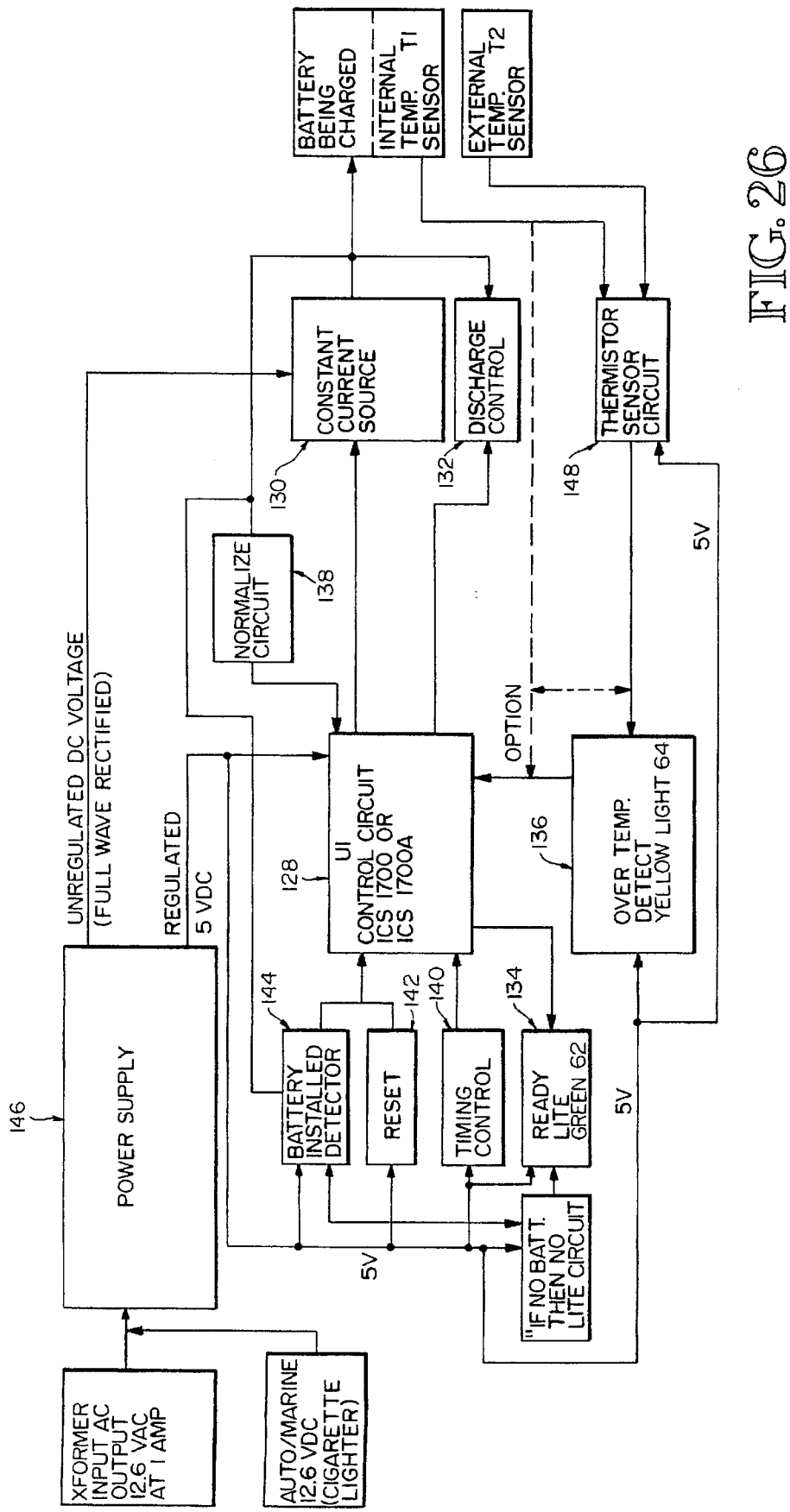
Figure 27:
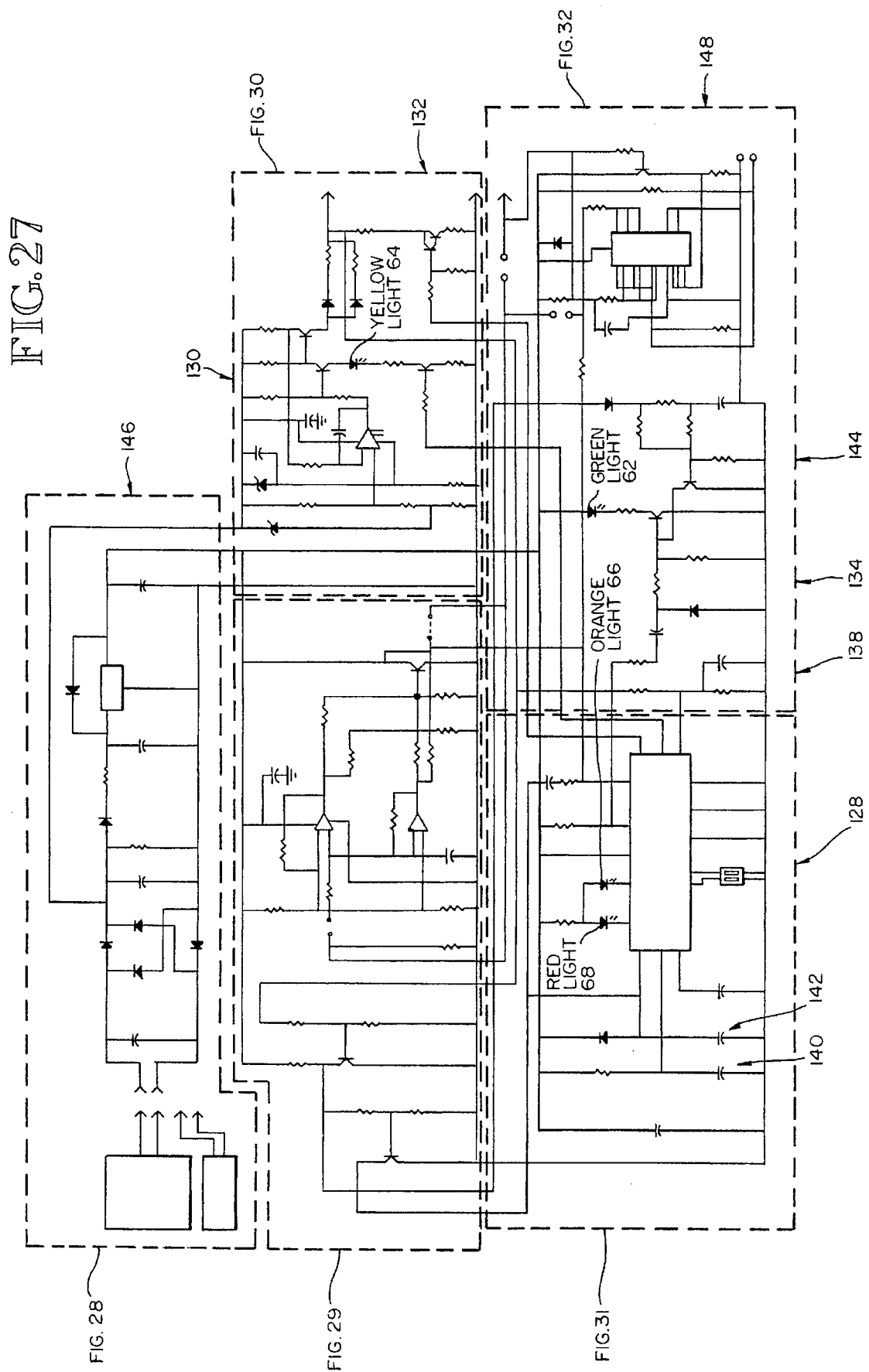
Figure 28:
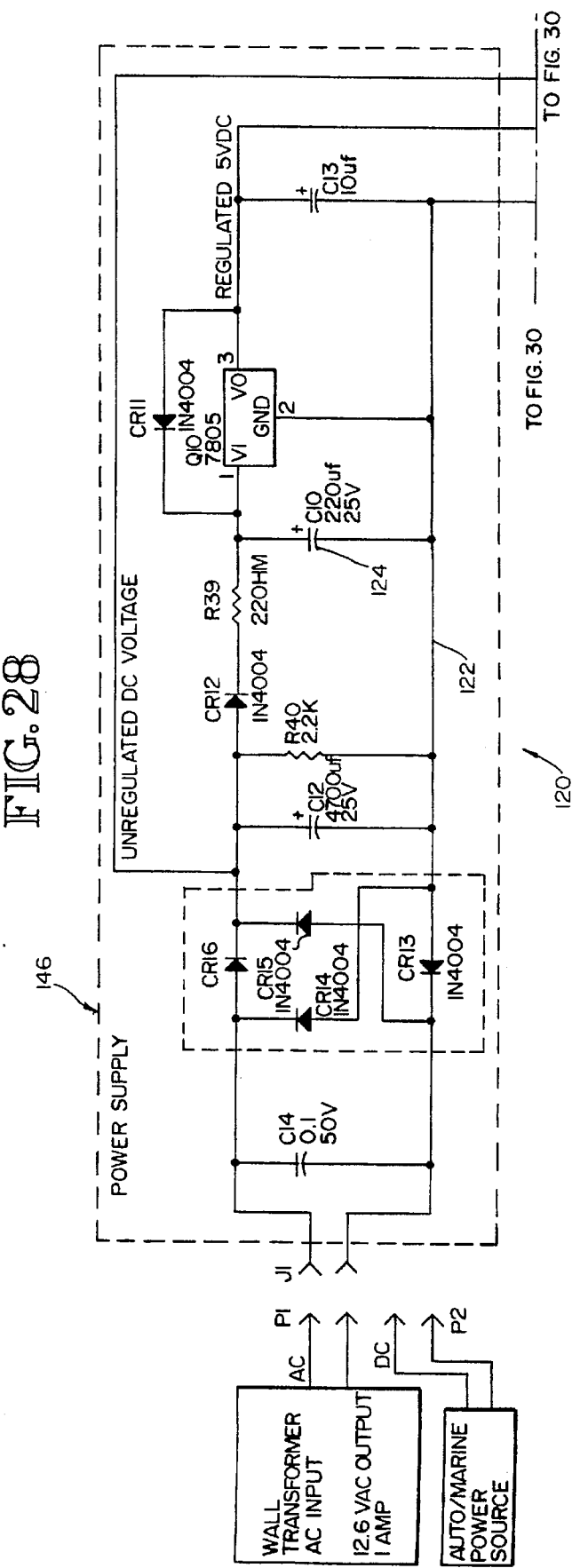
Figure 29:
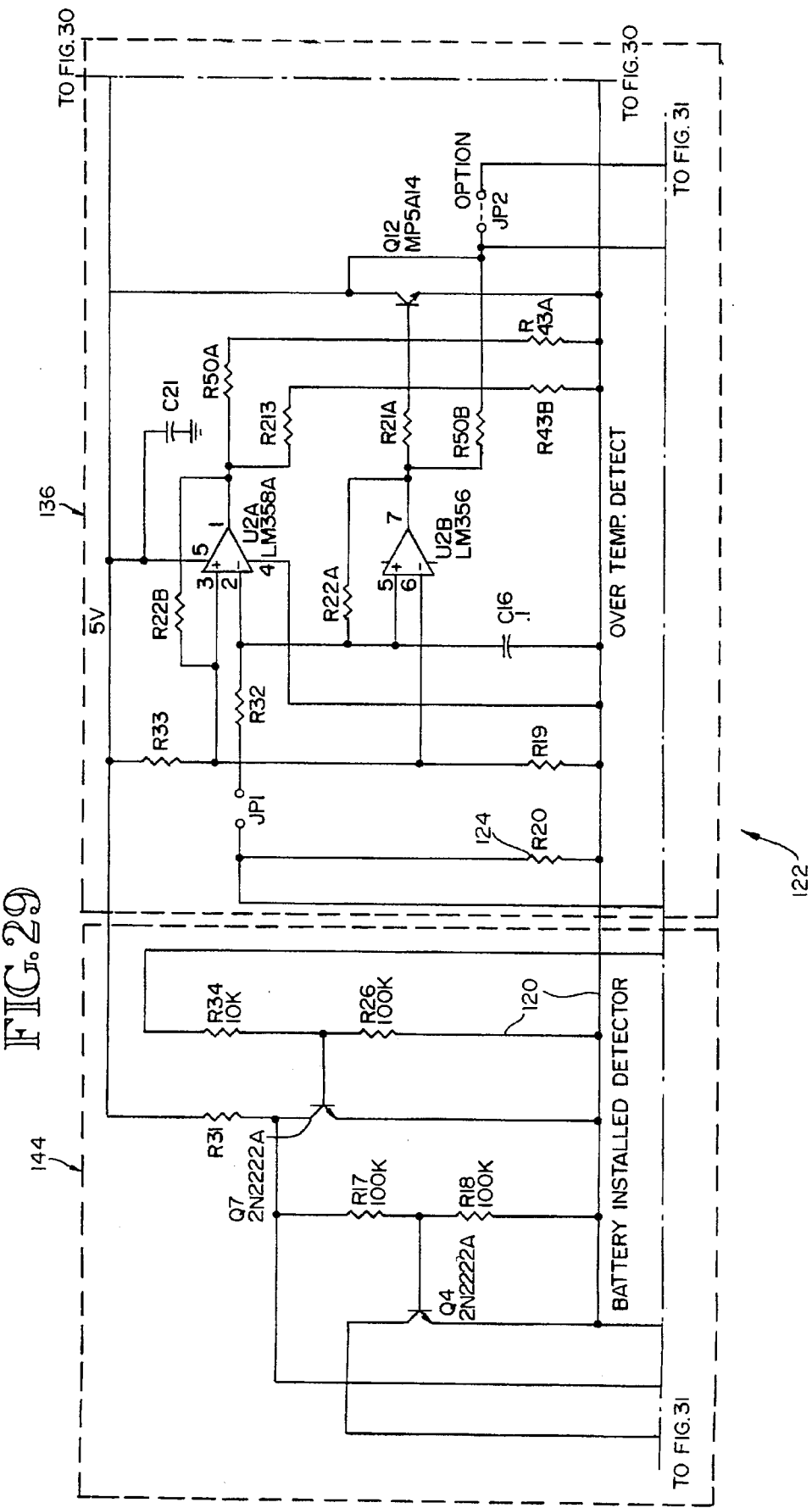
Figure 30:
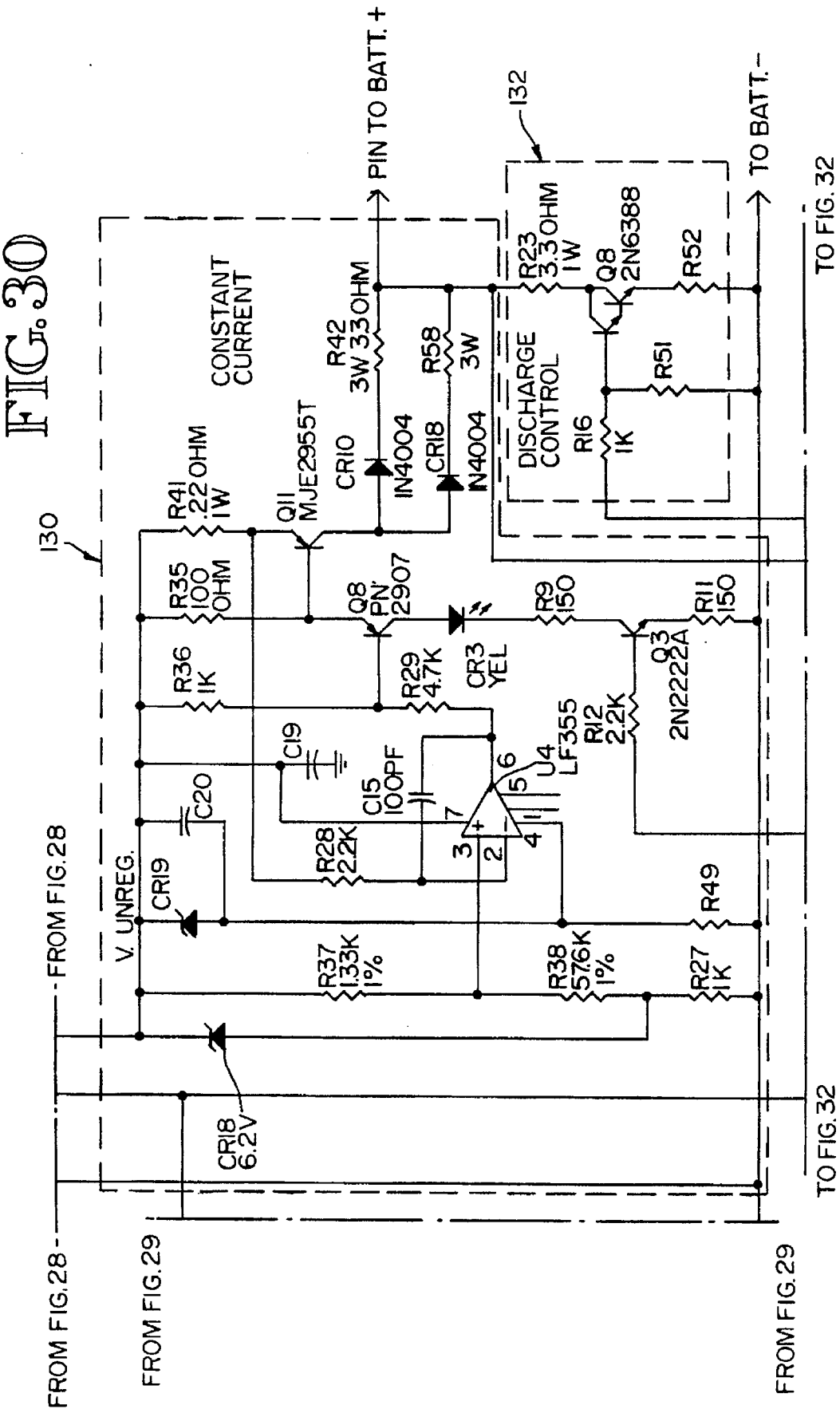
Figure 31:
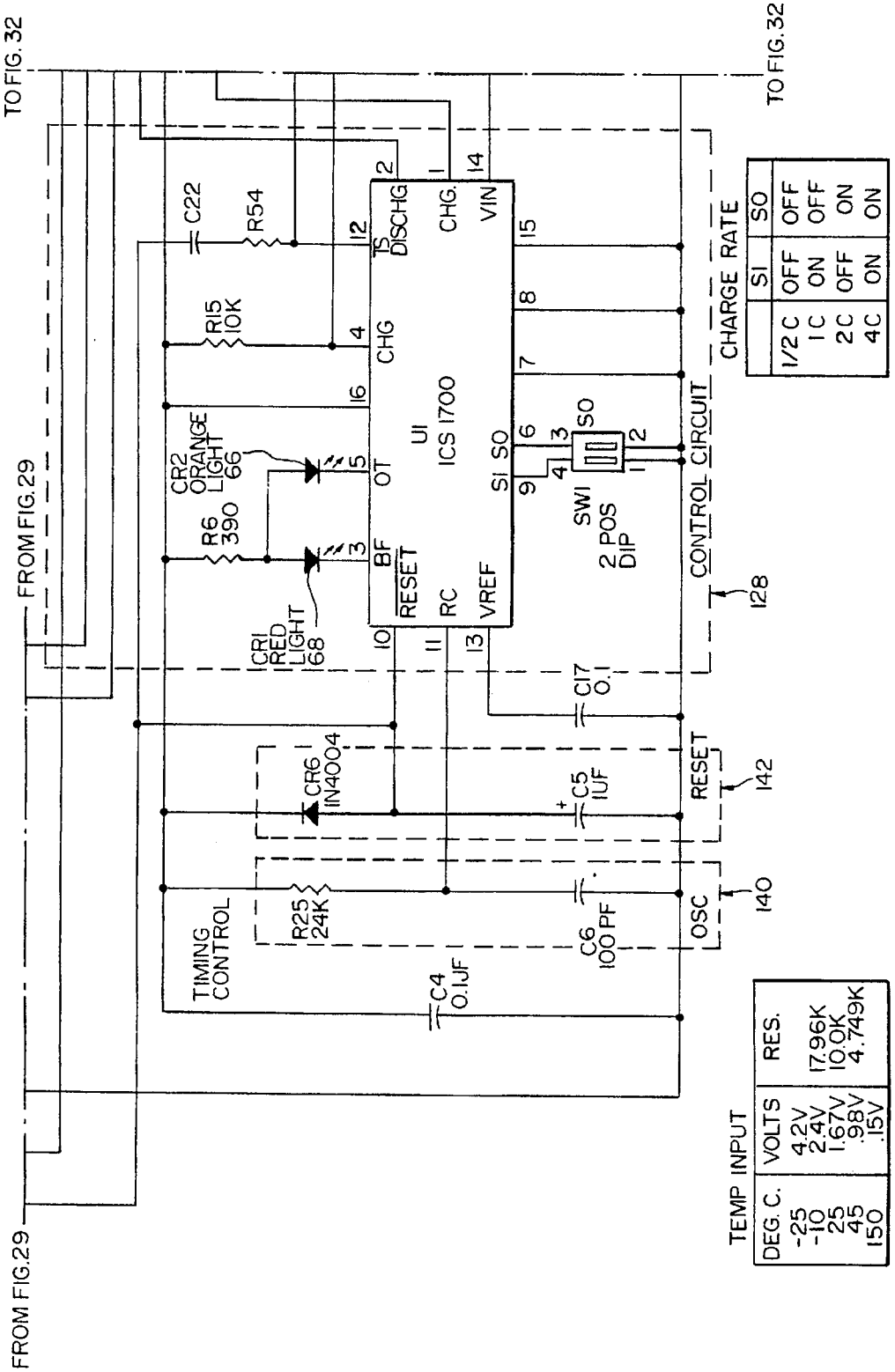
Figure 32:
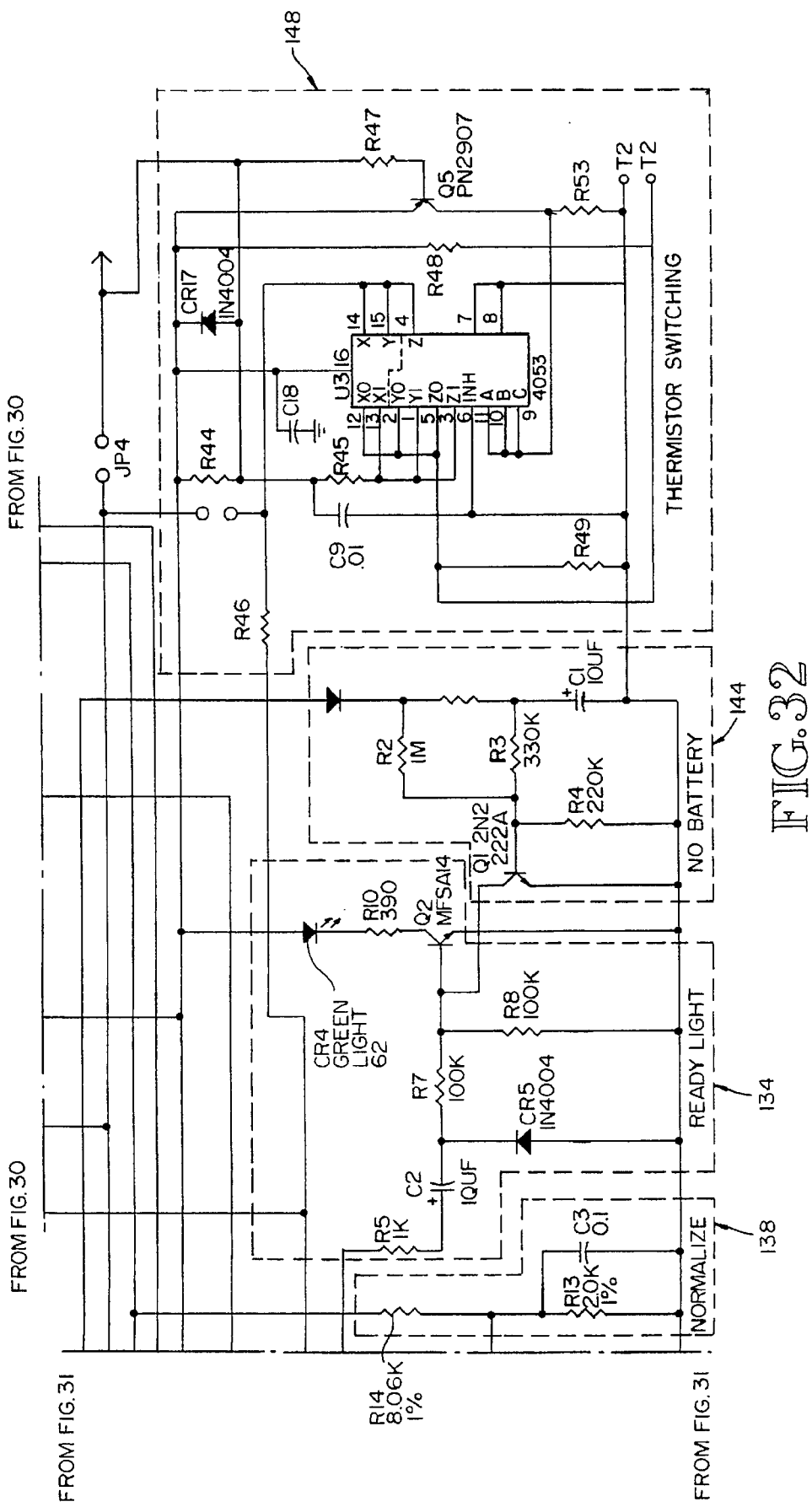

FIG. 18 is a cross-sectional view taken in reference to line 18—18 on FIG. 17, showing how this embodiment and all embodiments of the pulse-charger battery charger have a magnet with a bottom located flux plate, creating a magnetic force, which holds a battery in place until it is intentionally removed, and also showing a portion of a printed circuit board, and electrical and electronic components secured to the printed circuit board;

FIG. 19 is a top view of a pulse-charger battery charger in respect to another embodiment arranged with selected raised guides, or rails, or stops, used in positioning the battery, and indicating the set of electrical contacts;

FIG. 20 is a graph indicating a battery charging curve, and also curves pertaining to the pressure rise and the temperature rise of a battery during charging;

FIG. 21 is a graph indicating the first derivative of the battery charging curve shown in FIG. 20 and also in this FIG. 21;

FIG. 22 is a graph, in reference to the second derivative of the battery charging curve, i.e. waveform, of FIGS. 20 and 21 in respect to the sequences of charging and discharging pulses of all embodiments of the illustrated pulse-charge battery charger in reference to related amperes and times, and in reference to selected ratio of charging and discharging amperage with respect to selected times in milliseconds;

FIGS. 23, 24, and 25 are similar graphs illustrating how the undesirable memory effect of a nickel-cadmium, i.e. Ni—Cd, battery is eliminated by recharging such a battery in the pulse-charger battery charger: with FIG. 23 showing an initial discharging operating time of a battery, before it is first placed in a pulse-charger battery charger; with FIG. 24 showing the next discharging operating time of this battery, after it has been placed for the first time in this pulse-charger battery charger; and with FIG. 25 showing the next discharging operating time of this battery, after it has been placed for the second time in this pulse-charger battery charger, indicating the improvement in the continuing effective operating time, for example, of a cellular telephone;

FIG. 26 is a schematic block diagram, which is pertinent to all embodiments of this pulse-charger battery charger, illustrating the arrangement of the respective overall circuitry and components thereof;

FIG. 27 is an overall circuit diagram, which is pertinent to all embodiments of this pulse-charger battery charger;

FIG. 28 is a partial enlarged view of portions of the circuitry shown in FIG. 27, and such enlargement better illustrates the indicia and circuitry shown in the upper left and upper central portion of FIG. 27;

FIG. 29 is a partial enlarged view of portions of the circuitry shown in FIG. 27, and such enlargement better illustrates the indicia and circuitry, shown in the middle left and middle central portion of FIG. 27;

FIG. 30 is a partial enlarged view of portions of the circuitry shown in FIG. 27, and such enlargement better illustrates the indicia and circuitry, shown in the middle right portion of FIG. 27;

FIG. 31 is a partial enlarged view of portions of the circuitry shown in FIG. 27, and such enlargement better illustrates the indicia and circuitry, shown in lower left one half portion of FIG. 27; and FIG. 32 is a partial enlarged view of portions of the circuitry shown in FIG. 27, and such enlargement better illustrates the indicia and circuitry, shown in the lower right one half portion of FIG. 27.

DESCRIPTION OF THE PREFERRED EMBODIMENTS

The Utilization of All Embodiments, Illustrated and Not Illustrated

The pulse-charger battery charger 40 in respect to all its embodiments, such as the elongated battery receiving embodiment 42, the trapezoidal battery receiving embodiment 44, and the smaller battery receiving embodiment 46, are very effectively used to charge batteries, such as Nickel-Cadmium, i.e. Ni—Cd, batteries and Nickel-Hydride, i.e. Ni—MH batteries. The Ni—Cd batteries are known to self acquire bad memory effects if not charged properly.

Figure 1:
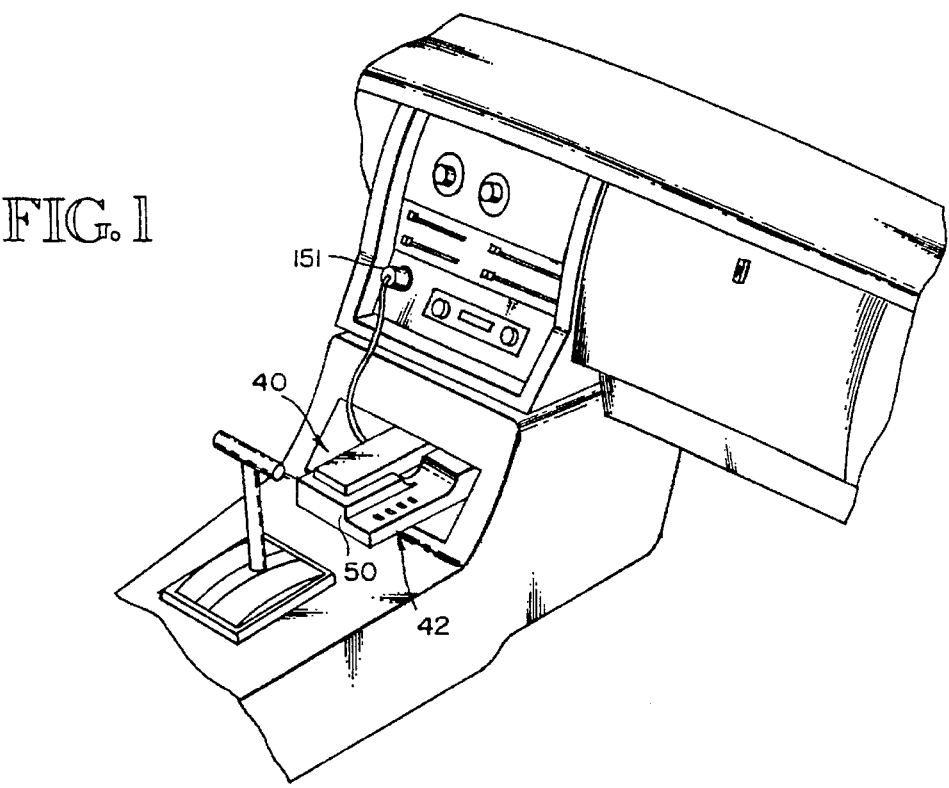
Figure 2:
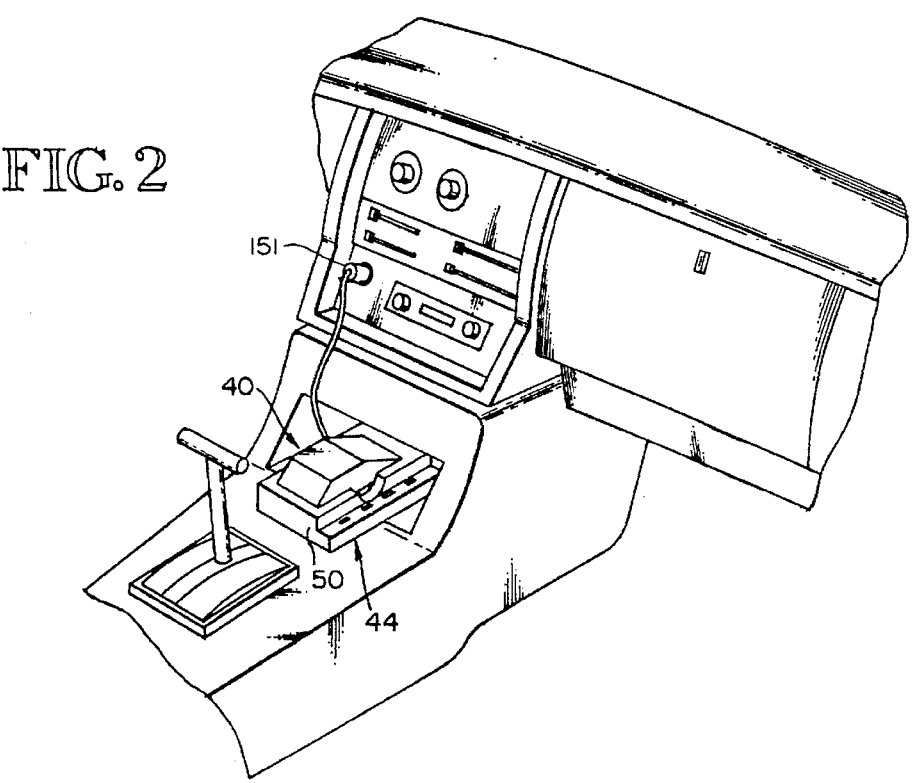

By using the pulse-charger battery chargers 40, in a person's automobile, as shown in FIGS. 1 and 2, or in a person's office, home or other building using a plug 150 to connect to high AC voltage supplied by a public utility electrical power supply, as indicated in FIG. 3 these bad memory effects of Ni—Cd batteries are avoided. The person using this pulse-charger battery charger 40 is freed from any worry or concern that he or she is not properly charging a battery to be subsequently used with: a cellular phone; a video recorder; a video cam recorder i.e. camcorder; a flashlight; an electric razor; a working tool; a garden tool, etc.

Advantages realized when using the pulse-charger battery charger 40 are:
 simple, automatic operation, no switches, no buttons;
 charge both Ni—MH and Ni—Cd batteries;
 eliminate Ni—Cd memory effect;
 charge to full rated capacity in about an hour;
 top off the battery at any time without building a memory;
 extend usable battery life up to ten times;
 restore many batteries thought to be dead in respect to previously charging with a different type of charger;
 leave battery on the charger indefinitely;
 charge safely under conditions of extreme heat;
 maintain battery at full charge without building a memory;
 remove battery and later resume charging without damage to the battery;
 remove and replace battery using fingers of one hand;
 the battery is guided into place and then held in place by the power of a magnet; and the charging operation utilizes either a twelve volt alternating current, i.e. AC, source, or a twelve volt direct current, i.e. DC, source, and for charging in a building, a transformer is provided to reduce the 110 AC voltage or higher voltage to 12 volts AC.

The status of the battery charging operation is readily observed: a green light blinks to indicate the battery is charged and ready to use; a yellow light pulses during the charging cycle; an orange light indicates the battery overheated and the charging has stopped while the battery is cooling down; and a red light indicates the battery is defective and should be removed.

Advantages further realized when the battery is used with a cellular telephone are:
 more reliable air time;
 fewer mid-call shutdowns;
 fewer batteries to buy, therefore fewer to throw away;
 more time for thinking about business, because a person no longer thinks so much about batteries, no longer worries about batteries, and no longer fusses or fiddles with batteries.

Selective Structural Components of the Embodiment

The pulse-charger battery charger 40 in respect to all its embodiments, has respective bases 48 of respective sizes, and respective interfitting overlaying covers 50, arranged together in respective pairs to form respective housings 52. These two principal respective paired structural components 48, 50 are secured by fasteners 54, after the interior placement of: a printed circuit board 56, with its added components, such as a resistor 58; a magnet 60; a flux plate 61, the green 62, yellow 64, orange 66, and red 68, light emitting diodes; a twelve volt AC or DC connector socket 70; and a set of electrical contacts 72.

Preferably the base 48 is available in limited style sizes, with only two style sizes being needed now. However, the covers 50, although sized to interfit with the limited style sized bases 48, will be of different styles to fit many different battery sizes. In FIGS. 1, and 3 through 9, the larger sized base 48 and cover 50 is shown, which receives the elongated battery 78. In FIGS. 2, and 10 through 16, the smaller sized base 48 and smaller sized cover 50 are shown, which receive the trapezoidal battery 94. Then, as illustrated in FIG. 17, a smaller sized cover 50 is slightly changed to have selected spacers 74 to position a smaller battery 95. In FIG. 19 another cover 50 is shown in respect to raised guides or rails 104, 106.

Selective Receiving Volumes of the Selected Structural components to Preposition the Respective Batteries Are Equipped With Guide Members to Insure the Positioning of the Battery Contacts Over the Contacts of the Pulse-Charger Battery Charger As shown in FIGS. 1, 3, and 4, the receiving volume 76 is sized to fit the elongated battery 78 between the respective sides 80, 82, the end abutment 84 and contact positioning end 86, of the elongated battery embodiment 42. There are finger access structures 88, 90 formed in the cover 50 and in these sides 80, 82, thereof to accommodate selected fingers of one's hand being used to raise or to lower an elongated battery 78, with respect to the receiving volume 76.

Figure 10:
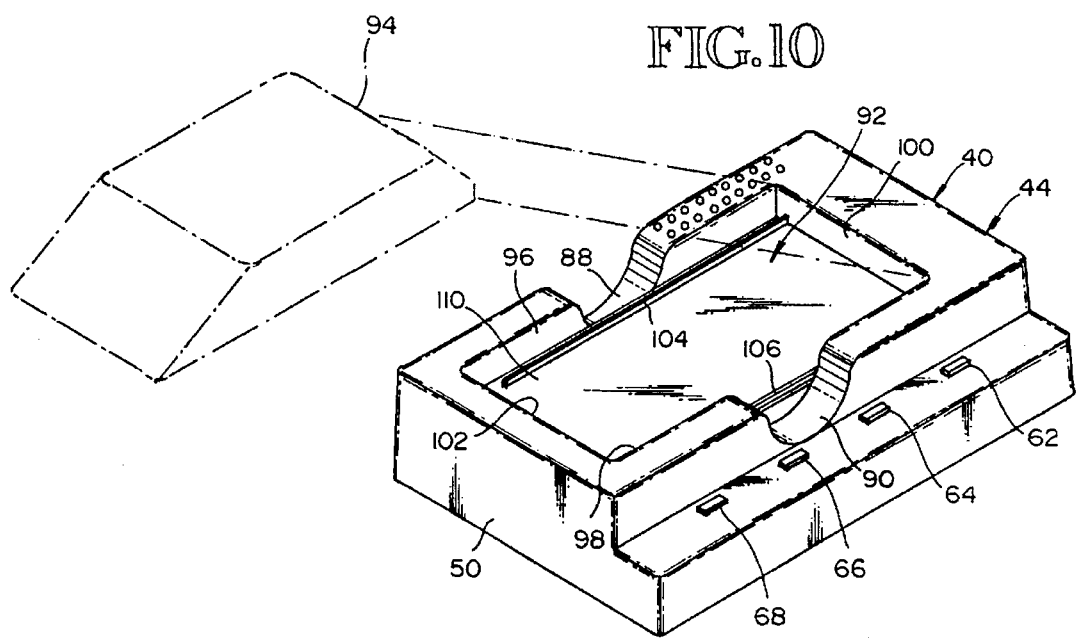
FIG. 10 is a perspective view of the pulse-charger battery charger shown in FIG. 2, indicating, via phantom lines, the lowering of a trapezoidal battery of a cellular telephone.
Figure 11:
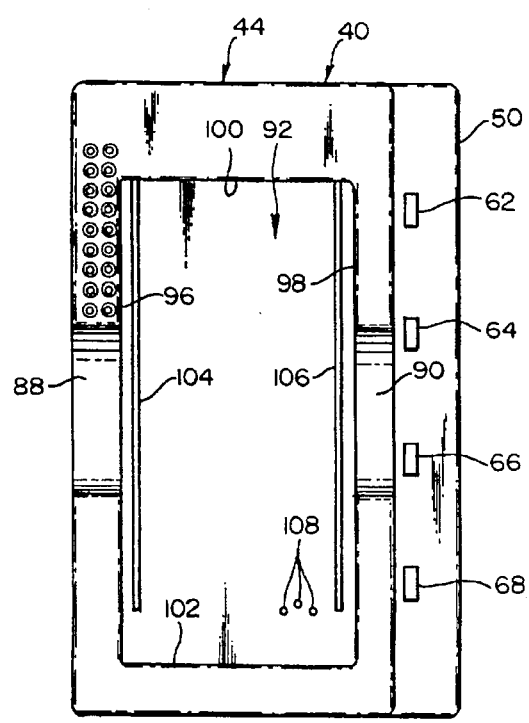
FIG. 11 is a top view of the pulse-charger battery charger shown in FIG. 10 showing electrical contacts, the vent holes and indicating lights.
Figure 12:
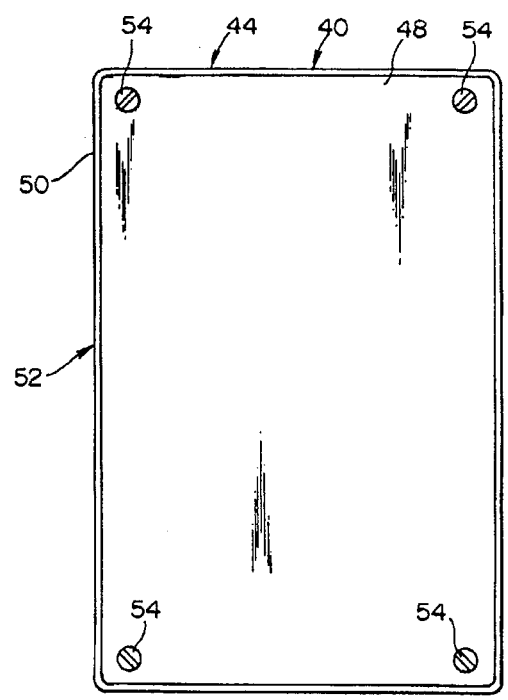
FIG. 12 is a bottom view of the pulse charger battery charger shown in FIG. 10 showing the fasteners.
Figure 13:
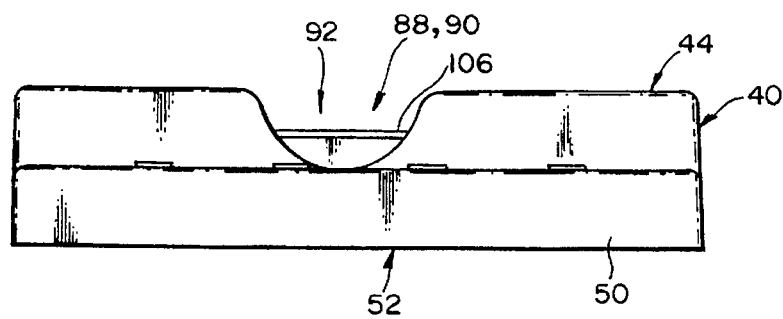
FIG. 13 is a right side view of the pulse-charger battery charger shown in FIG. 10.
Figure 14:
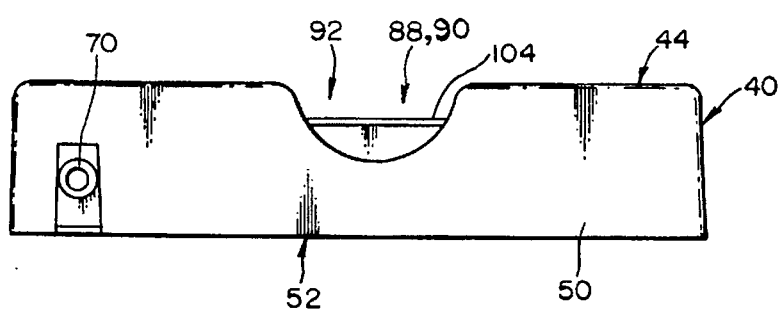
FIG. 14 is a left side view of the pulse-charger battery charger shown in FIG. 10 showing the plug in connection socket.
Figure 15:
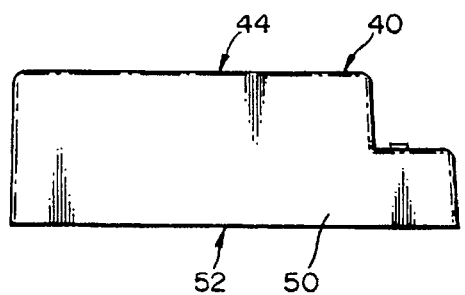
FIG. 15 is a front view of the pulse-charger battery charger shown in FIG. 10.
Figure 16:
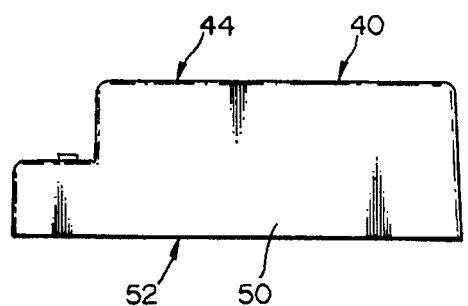
FIG. 16 is a back view of the pulse-charger battery charger shown in FIG. 10.

As shown in FIGS. 2, 10, and 11, the receiving volume 92 is sized to fit the trapezoidal battery 94 between the respective sides 96, 98, and respective ends 100, 102. Two spaced raised guides 104, 106, also called rails, direct an incoming trapezoidal battery 94 to a position over the group of contacts 108 of this embodiment 44, while keeping the battery contacts, not shown, spaced clear of the bottom 110 of this receiving volume 92, until they are positioned directly over the group of contacts 108. When the trapezoidal battery 94 reaches this position where the contacts are aligned, it lowers into position.

As shown in FIG. 17, this embodiment 46 which receives a smaller battery 94 has selected spaced spacers 74 to define a receiving volume 116. Other selected spaced spacers are used in other battery size embodiments, not shown, to define different selected sizes of receiving volumes.

the Holding Power of a Magnet in Each Embodiment Keeps the Respective Battery in Place in the Receiving Volume With All Battery Contacts Being in Contact With Their Respective Paired Contacts of the Pulse-Charger Battery Charger As shown in the cross sectional view of FIG. 18, each embodiment has a magnet 60 rated preferably at one thousand gauss, and preferably in a size of ⅜" by ⅞" by 1⅞". Located below each magnet 60 is a flux plate 61, which alters the positioning of the magnetic field to enhance the magnet's holding power, thereby keeping a selected battery firmly in place in a respective receiving volume, while all the respective contacts are properly in contact with their aligned contacts. A person using this pulse-charger battery charger does not have to be concerned with the operation of any mechanical operating holding, or releasing latches, grooves, etc., otherwise to be used, in the absence of magnetic holding power.

The Completed Placement of a Selected Battery Resulting in the Contacts of the Aligned Respective Contacts of the Selected Battery and the Selected Embodiment of the Pulse-Charger Battery Charger Automatically Starts the Charging of the Battery, and Upon Removal of the Battery, the Charging Capability of This Charger is Interrupted Automatically A person using any embodiment 40 of this pulse-charger battery charger, does not have to operate on and/or off switches or buttons. When he or she has completed the placement of a selected battery in the receiving volume causing the aligned contacts to make contact, the charging capability of the charger is automatically available. After the battery is removed, the charging capability of the charger is automatically interrupted, until a battery is subsequently correctly positioned and so held by the force of the magnet.

When a Selected Battery is Fully Charged, the Charging Capability of the Pulse-Charger Battery Charger is Automatically Stopped A person using any embodiment 40 of this pulse-charger battery charger, does not have to be concerned about removing the selected battery when it has been fully charged. The charging capability of this charger is automatically stopped when the battery is fully charged and still in place in the receiving volume of the pulse-charger battery charger.

When a Selected Battery is Being Charged and Overheating Commences, the Charging Capability of the Pulse-Charger Battery is Automatically Stopped, and When Sufficient Cooling has Transpired, Charged Resumes Automatically A person using any embodiment 40 of this pulse-charger battery charger, does not have to be concerned about any extended overheating of the battery during the charging period. The charging capability of this charger is automatically stopped, when overheating commences. Thereafter, when the battery has cooled sufficiently, the charging is resumed automatically.

The Changes of Voltages, Temperature, and Pressure of a Battery During Charging

In FIG. 20 a graph illustrates the charging curve of a battery, the temperature rise during the charging time, and also the pressure rise during the charging time of a battery.

In FIG. 21, a graph again illustrates the charging curve of a battery, and also shows the first derivative of this charging curve of the battery, which is also referred to as the linear regression curve. Then in FIG. 22, a graph illustrates the second derivative of the charging curve of the battery. This second derivative results in the abrupt visual changes, and these changes are representative of electrical and electronic sequences of the pulse power charging pulses of all embodiments of the illustrated pulse-charge battery chargers. As illustrated in FIG. 22, the charging amperage, considered as a unit of one, is undertaken preferably for one thousand milliseconds. Then no charging preferably occurs for two milliseconds. Following this no charging time, discharging amperage, considered as a unit of three, is undertaken preferably for five milliseconds. Thereafter, no charging or discharging occurs for ten milliseconds. This cycle of amperage and preferred times, is repeated again, and perhaps several times until the battery is fully charged. Although this cycle and the times given are preferred, other similar cycles and times may be selected. For example, the charging time may be fifteen hundred milliseconds, followed by a no charging time of three milliseconds, then a discharging time of seven and a half milliseconds, ending in fifteen milliseconds of a second no charging time, often referred to as a testing time.

Effectiveness of Charging When Using This Pulse-Charger Battery Charger

In FIGS. 23, 24, and 25, graphs somewhat similar to one another in their representation illustrate how the undesirable memory effect of a nickel—cadmium, i.e. Ni—Cd, battery is eliminated, by recharging such a battery in this pulse-charger battery charger 40. In FIG. 23 an initial discharging operating time of such a battery is illustrated. This battery has not been placed previously in this pulse-charger battery charger 40. Then this battery is charged for the first time in this pulse-charger battery charger 40. Thereafter, as indicated in FIG. 24, the discharging operating time has been substantially extended. Thereafter, this battery is charged for a second time in this pulse-charger battery charger 40. Subsequently, as indicated in FIG. 25, the discharging operating time has been extended again to a longer successful operating time. Such a longer time is especially appreciated by cellular telephone users who use this pulse-charger battery charger 40.

Further Understanding of How These Excellent Performance Features of This Pulse-Charger Battery Charger Are Obtained Will be Realized Upon Considering the Electrical Circuits, Electrical Wires, and Electronic Components Thereof, in Their Preferred Embodiment, Which is Illustrated, Both in a Block Diagram and in Circuit Diagrams, and in Addition Reference Numerals, Industry Standard Names, Numbers, and Symbols are Used The electrical circuits 120, with their respective wires 122, and electronic components 124 in regard to their operational functions are indicated in FIG. 26 in a schematic block diagram. Their overall arrangement is illustrated in the circuit diagram of FIG. 27. Then in FIGS. 28, 29, 30, 31 and 32, respective portions of the overall circuit diagram are shown. These enlarged scale figures have indicia, i.e. letters, words and numbers, of adequate readable size.

The numbers referring to the blocks presented in FIG. 26 are repeated in FIGS. 27 through 32, in respect to identifying the respectively numbered broken line outline surrounding respective portions of the circuitry 120. These respective portions of electrical circuits 120, electrical wires 122, and electronic components 124, are arranged to serve the respective function indicated by the descriptive terms given both in the respectively numbered blocks of the block diagram, and within the respective broken line outlines in the circuit diagrams.

This Pulse-Charger Battery Charger Utilizes a Controller Designated by the Standard Designation of U1

Previously and currently there are other pulse-charger battery chargers and generally they include in their circuitry a controller designated by the industry standard notation of U1. This controller U1 is described as a monolithic integral circuit that supervises and controls the charge and charge termination of a rechargeable Nickel-Cadmium battery.

This pulse-charger battery charger 40 utilizes this controller U1 and, in effect, surrounds it with additional electrical circuits 120 and electrical components 124, to provide, many of the added functions, which make the use of this pulse-charger battery charger 40 very convenient to all persons, who just want to conveniently position and conveniently remove a battery with respect to this pulse-charger battery charger 40, and thereafter the charging functions are automatically undertaken, while the battery is held in place by the magnet 60. U.S. Pat. No. 4,746,852 of May 24, 1988 illustrates and describes a controller for a battery charger invented by Roy L. Martin. The assignee of this patent, Christie Electric Corporation, licensed Integrated Circuit Systems Inc. to produce this controller, which now is designated as the U1 controller.

More Specific Information is Presented Regarding the U1 Controller, i.e. U1 Control Circuit and the Added Circuits, i.e. Surrounding Circuits, Electric and Electronic Components The following descriptions are arranged under headings which correspond to the writings and numerals presented on the block diagram of FIG. 26, and the circuit diagrams of FIGS. 27 through 32.

Control Circuit

The control circuit 128 is designated by the industry standard symbol U1. It is an industry standard controller manufactured by Integrated Circuit Systems, referred to as ICS, under license pertaining to U.S. Pat. No. 4,746,852. The controller U1 is described in ICS literature titled "Data Book 1992" copyright 1992. The control circuit 128 also called controller U1, 128 as illustrated in FIGS. 26, 27 and 31, operates to control: the constant current circuit 130 via U1 pin 1; the discharge control circuit 132, via U1 pin 2, the LED indicators. Via U1 pin 3 for defective battery, red light 68, and refer to CR1; pin 5, over temperature detection, 136, orange light 66, and refer to CR2; pin 4 for battery charged and ready, 134 green light 62, and refer to CR4, and indirectly the charge time, yellow light 64, and refer to CR3 via pin 1 in conjunction with the constant current control 130. The controller U1 also measures, records, and monitors the battery voltage via U1 pin 14 and the normalize circuit 138. The over temperature 136 is monitored by U1 pin 12. The timing is set for the controller U1 by the timing control circuit 140 at pin 11, and the reset 140 is monitored by the controller U1 at pin 10. Switches S1 and S2 connect to the controller U1 pins 9 and 6 respectively and are non-user inputs that are set during manufacture to define the average size of the battery type to be charged. These settings are determined by the combination of battery size and the value of the current set by the constant current circuit 130. The values set relate to the charge rate "C" of the battery, where C is equal to the capacity of the battery measured in amp-hours divided by 1 hour.

C=amp-hours/1 hour

By determining the average C-rate of the batteries to be charged on a particular model of this charger and by selecting the charge current by setting the values, as described in the constant current circuit 130, the settings for the controller U1 pins 6 and 9 are determined and pre-set. Example: if the average C-rate of all batteries to be charged is 1.4 amps and the constant current is set to be 0.7 amps then the settings for S2 at controller U1 pin 6 would be off and S1 at controller U1 pin 9 would be off. See charge rate in charge rate table of FIG. 31 for a selection of ½ C, which pertains to $1.4/0.7 = ½$. Setting the charge rate thusly programs the controller U1 to control the charging system operation as desired.

Timing Control

In respect to the timing control circuit 140, the timing of operation of the controller U1 is defined by the frequency of an internal oscillator. The frequency of the oscillator is set by the selection of resistor R25 and capacitor C6. The operation of the controller U1 is characterized by the manufacturer with the oscillator parameters of R25 and C6 set for 1 megahertz. However, in this charger, a deviation has been made to more closely match the needs of the user, and thus allow a wider variety of battery sizes and types to be charged, without the user being required to set any switches or otherwise set any control values.

Reset Circuit

The requirement for the controller U1 to be started at the correct time is accomplished in part by the reset circuit 142 consisting of C5 and CR6. Upon start up, when power is first applied, the capacitor C5 will be charged from the 5 volt supply through a resistor internal to U1 and connected to pin 10. Since the controller U1 remains reset, i.e. dormant, as long as the voltage at U1 pin 10 is at or near 0, and since, before power is applied to the system, cap C5 has no charge, i.e. zero volts, therefore the control circuit is reset at the instant of power application. The controller U1 will begin operation when the voltage on cap C5 increases to at or near 5 volts. In conjunction, the battery installed detector 144 maintains a short circuit, via Q4, thus there are zero volts, on cap C5, until a battery is placed upon the charger. Detection of a small battery voltage by the battery installed detector 144 will remove the short circuit from Q4 and allow cap C5 to charge to at or near 5 volts thus allowing the control circuitry of the controller U1 to begin operations.

Normalize

The batteries to be charged are made up of individual cells and each cell has a characteristic voltage. For nickel-cadmium batteries, the voltage per cell is approximately 1.2 volts per cell. Thus for a battery to provide a voltage of 7.2 volts would require that it be made up with 6 cells connected in series, i.e. 6×1.2=7.2. Because different batteries can be made up for different operations, and thus different voltages, and it is advantageous to operate the control circuit on a standard voltage, then it is desirable to divide the battery voltage by the number of cells in the battery and operate the control circuit on a normalized voltage equal to the voltage of one cell, i.e. 7.2 volts/6=1.2 volts. In the normalize circuit 138, resistors R14 and R13 are selected to provide a voltage division equal to the number of cells in the battery type to be charged. By using the normalize circuit 146, the requirement is eliminated for the user to have knowledge of the voltage of his or her battery, and program into the battery charger the voltage of his or her battery.

Light Emitting Diode, i.e. LED Indicators

It is desirable to have an indication to the user as to the step by step operation of the charger, therefore this charger utilizes four such indicator lights. They indicate the following functions. When the control circuit turns on the constant current indicator, light CR3, a yellow 64 LED, receives current from the unregulated voltage, through R35 in parallel with R41 and Q11, through Q6 and further through R9, Q3 and R11. When the constant current is turned off the yellow 64 light CR3 is off, indicating no charge is taking place and/or the discharge control 132 is on and it is discharging the battery momentarily.

When the charge cycle has completed and the controller U1 has determined that the battery is fully charged, then the constant current circuit 130 is turned off, thus the charging indicator CR3, a yellow 64 LED is turned off. At this time, the ready light CR4, green 62 LED, is cycled on and off periodically to bring attention to the user that the charging process is complete. The ready blinking green light 62 is controlled via controller U1 pin 4 through resistor R5 and capacitor C2, and associated circuitry for transistor Q2. The controller U1 is originally characterized by the manufacturer to provide a control function at pin 4, such that an indicator light connected to this pin could be on while the battery is charging, and also cycling on and off when ready. However, this is not appropriate for the user, therefore in this charger the circuitry is changed and differs, in that capacitor C2 blocks the application of the signal from controller U1 pin 4 during the charge period, but allows the green light 62 cycling signal to be applied to Q2, so the blinking green light 62 will then be indicative of a completed charge and that the battery is ready to be used again.

If No Battery—Then No Light

The circuit associated with Q1 operates to ensure that if no battery is present in the charger as determined by the battery installed detector 144, then Q1 is turned on and provides a short circuit to Q2 and keeps Q2 from turning on, therefore the ready green light 62 CR4 cannot be on.

If no battery is present, Q7 is off and 5 volts is provided from R31 through CR7 to R2 and R4. The resulting voltage at R4 is sufficient to turn Q1 on which will keep Q2 off. In addition the 5 volts is also applied to R1 and C1 causing C1 to charge up to at or near 5 volts. When a battery is placed on the charger the voltage at Q7 is at or near zero volts, and diode CR7 is reverse biased, such that capacitor C1 cannot discharge through CR7 and therefore discharges primarily through R3 to R4, and keeps Q1 on for an additional length of time to insure that the ready green 62 light does not come on while 2 is charging through R7.

power Supply's Unregulated DC Voltage

The power supply 146 is designed using either an AC, i.e. alternating current, or DC, direct current, power source. If an AC power source is applied as from a transformer, then CR16 and CR13 conduct current for the positive half of the voltage cycle, and CR15 and CR14 conduct during the negative half of the cycle, thus providing a positive voltage at the junction of CR16 and CR15, for either half of the voltage cycle. This configuration is commonly referred to as a "full wave bridge rectifier". If a DC power source is applied as from an automotive or marine connection, such as from a cigarette lighter plug, then for one certain polarity of connection, diode CR16 and CR13 will conduct current, and for the opposite polarity of connection diodes CR15 and CR14 will conduct. In either case, the voltage at the junction of CR16 and CR15 will be positive the same as it was for the AC power source condition. Capacitor C12 is used to absorb the majority of the voltage fluctuations that may occur at this point. The resulting voltage at C12 is a function of the applied voltage from whichever power source is used, and is therefore termed as unregulated DC voltage. The unregulated voltage is supplied to the constant current circuit 130.

Power Supply's Regulated 5 Volts DC

The unregulated voltage is supplied to Q10 through CR12 and R39 and stored on C10. CR12 prevents a sudden or short duration loss of the unregulated voltage from affecting the voltage stored on C10 and supplied to Q10. Q10 is an industry standard voltage regulator that accepts an unregulated input voltage of 7 to 35 volts and provides an output voltage of 5 volts. Capacitor C13 is charged up to the 5 volts and absorbs any short duration variations that may occur. The regulated 5 volts is further provided to the control circuits of the controller U1 and accompanying circuits.

Thermistor Selection Switching

The thermistor sensor circuit 148 selects one of two possible temperature sensing units. If a temperature sensing unit T1 is located integral to the battery pack being charged, then this circuit 148 will select it, otherwise this circuit 148 will default and select a temperature sensing unit T2, which is strategically located in the battery charger 40.

When a battery is placed in the charger it makes electrical contact with contacts A, B, and C. Contact A is the positive, (+), terminal, contact B is the negative, (−) terminal, and contact C is the temperature sensing device terminal. The sensor T2 installed in the charger is connected between contacts T2A and T2B.

Integrated circuit U3 within this thermistor switching circuit 148 is a standard component manufactured by others and identified as a "Triple Analog Gate", with RCA part No. CD 4053B. U3 is operated with a supply voltage of 5 V via pin 16 and a switching voltage of 5 V via pins 9, 10, 11. A single analog gate is all that is required. However, the use of a triple gate integrated circuit, i.e.I. C., is undertaken because it is an easily used industry standard integrated circuit.

Thermistor Switching Operations

Resistor R48 supplies current to sensor T2 from the 5 V supply. T2 resistance is tabulated in a table on FIG. 31. The voltage on T2 is also shown in this table for different temperatures when R48 is set to 24,000 ohms and an industry standard thermistor is installed that is characterized at 10,000 ohms at 25 degrees C.

The voltage at T2A is connected to the normally closed analog gates at U3 pins 2.5 and 12. The outputs are connected to U3 pins 4, 14, 15 when the select voltage at U3 pins 9, 10, and 11 is at or near zero volts.

The voltage at contact C, in reference to the temperature unit T1, is connected to the normally open analog gates at U3 pins 1, 3, 13 through resistor R45. The outputs are connected to U3 pins 4, 14, 15, when the select voltage at U3 pins 9, 10, 11 is at or near 5 volts.

With no thermistor, i.e. temperature unit, connected to contact C, resistors R44 and R47 connect 5 volts, i.e. 5 V, to PNP transistor Q5, thus no current will flow in R53, thereby keeping U3 pins 9, 10, and 11 at or near zero volts. Therefore U3 will select the temperature sensor unit T2 output to be provided through R48 to the controlling integrated circuit, i.e. IC, U1 pin 12.

Connection of a temperature sensing unit to contact C and contact B will provide a current path from resistor R44, thus providing a voltage, as described in the table in FIG. 31, when R44 is set to 24,000 ohms and T1 is a standard thermistor, i.e. temperature sensing unit, whose resistance is 10,000 ohms at 25 degrees C.

Resistor R47 is significantly large so as to not significantly effect the voltage at contact C. For temperatures warmer than −10 degrees C., the voltage at contact C will be less than 5 V and thus transistor Q5 will conduct, supplying current to R53 sufficient to cause a voltage at or near 5 V to be supplied to U3 pins 9, 10.11. This input will cause the normally closed analog gates, connected to T2, to open, and the normally open analog gates, connected to T1, to close, thus electrically connecting the voltage on T1 to U3 outputs pins 4, 14, 15 and through R46 to the controller, U1 pin 12. Diode CR17 is a damping diode to protect the circuit in the event an unwanted voltage greater than 5 V would be accidentally applied to the input at contact C. Capacitor C18 is a bypass capacitor to protect U3, in case of undesirable voltage transients. C9 is for protection against transients from the temperature sensing unit T1.

"Battery Installed" Detector

When a battery is installed between contact A(+) and contact B(−), the battery voltage will be applied to resistor R34. Selection of appropriate values for R34 and R26 will result in sufficient voltage to exceed the input requirements of transistor Q7, and the transistor Q7 will conduct current through R31 from the 5 V supply to the 5 V common return. This will bypass the current from R31 to R17 and R18. Since little or no current will flow in R17 and R18, the voltage at Q4 will be at or near zero, thus no current will flow through Q4. This will allow current from a current source internal to U1 at pin 10 to flow into capacitor C6, charging C6 and after sufficient time, defined by the value of C6 and the available charge current from U1 pin 10, the voltage at U1 pin 10 will be sufficient, being greater than approximately 3 volts, to allow the control circuits arranged internally in controller U1 to begin operation.

When the battery is removed from contact A(+) and contact B(−), then no voltage will be applied to resistor R34 and R26, thus there will be insufficient voltage at Q7, and Q7 will not conduct current. The current from the 5 V through R31 will be applied to R17 and R18, resulting in sufficient voltage to be applied to Q4, and C6 will discharge to a voltage at or near zero volts. This will cause the control integrated circuit, 1C, U1 to reset, thus stopping operation.

Overtemperature Detection integrated circuits U2A and U2B used in the overtemperature detection circuit 136 are industry standard operational amplifiers designated as LM358A. These two separate operational amplifiers are included in a single package, which is commonly referred to as a "dual op amp".

The inputs of both op amps are connected through jumper JP1 option to contact C through jumper JP4 option, or to the output of U3 through jumper JP3 option. Amplifier U2B is configured as a comparator with a threshold set by resistors R33 and R19, and the hysteresis is set by R22A and R32. Comparator U2B is connected as a non-industry comparator. Using a negative temperature coefficient temperature device such as T, or T2, as an input to U2B, results in a negative transition at U2B pin 1; when T1 or T2 sense an increase in temperature in the battery, beyond the threshold set by R33 and R19. This negative transition can be applied directly to the temperature control input of U1 through resistor R50B, or it can be inverted by connecting to transistor Q12 through resistor R21A.

Comparator U2A is connected as an inverting comparator. Using a positive temperature coefficient temperature device such as T1 or T2 as respective inputs to U2A, results in a negative transition at U2A pin 1, when T1 or T2 sense an increase in battery temperature beyond the threshold set by R33 and R19. This negative transition can be applied directly to the temperature control input of U1 through resistor R21B, or it can be inverted by connecting it to transistor Q12 through resistor R50A.

Selection of JP4 option and JP2 option will allow connection of T1 directly to the control integrated circuit, i.e. 1C, U1 pin 12.

Constant Current

Integrated circuit U4 used in the constant current circuit 130 is an industry standard operational amplifier defined as LF355. It is connected as a voltage follower, whereby the output, U4 pin 6, will modify its voltage, so as to keep input U4 pin 2 voltage equal to the input U4 pin 3 voltage. Input U4 pin 3 is set to a desired voltage as defined by Zener diode CR18 and resistor R27, which together establish a reference voltage such as 6.2 volts, which is further divided by resistors R37 and R38. Since resistor R41 is connected to the same voltage supply as resistor R37, and the U4 pin 2 is maintained at the same voltage as the U4 pin 3, and since there is little or no current flowing in resistor R26, then the voltage established across resistor R37 is equal to the voltage established across resistor R41. Therefore, since the voltage across R37 is constant, then the voltage across R41 is constant. Then further since the current: in a resistor is equal to the voltage across that resistor divided by the value of that resistor, i.e. I=V/Rf, therefore the current passing through R41 must be a constant. Moreover, therefore the current supplied to the battery being charged, through CR10 and R42 and/or CR18 and R56 and contact A must be a constant. Transistor Q3 is controlled by the controller U1 pin 1 and is operated as an electronic switch. When controller U1 provides a voltage output to Q3 through R12, transistor Q3 switches on and conducts current through R35, Q8, CR3, R9, and R11, thus providing a control voltage to Q11 to allow the described operation of integrated circuit U4, of the constant current circuit 130.

Discharge Control Circuit

In the discharge control circuit 132, the transistor Q6 is controlled by the controller U1 pin 2 through R16. Q6 operates as a switch when R51 is omitted and R52 is zero ohms. When Q6 is switched on, the battery voltage is impressed across resistor R23, and a resulting discharge current, equal to the battery voltage divided by the value of resistor R23, is drawn from the battery.

Q6 also can be operated as a current control to regulate the value of the discharge current regardless of the battery voltage by utilizing resistors R51 and R53 and selecting R23 as zero ohms. The control voltage from controller U1 pin 2 is 5 volts and is divided by the resistor pair of R16 and R51. The resulting voltage is impressed across Q6 and R52. Since the voltage is approximately constant across R52, then the current is equal to the applied voltage divided by the value of R52, and is therefore approximately constant and independent of the battery voltage.

A Summary of Some of The Unique Features of The Overall Operation of the Circuitry and Components of This Pulse-Charge Battery Charger These unigue features are:

The power supply is designed to accept either AC volts or DC volts and still provide proper voltages and current to the charger;

A constant current controllable circuit is switched on and off accurately from a lower voltage, 5 volt, control circuit;

A discharge control circuit is switched on and off accurately from a lower voltage, 5 volt, control circuit and operated as a constant current discharge circuit to enhance the operation of low voltage batteries;

A "battery installed" detector operates to start the charger automatically when a battery is placed in the charger;

An overtemperature detection circuit monitors the temperature of a battery and provides a control signal to the control circuit for either a temperature sensing unit that generates a negative going voltage with an increase in temperature or one that generates a positive going voltage with an increase in temperature;

A thermistor switching circuit automatically selects the appropriate temperature sensing device;

An indicator light preferably yellow 64 indicates when the battery is charging and when it is discharging;

An indicator light preferably green 62 indicates when the battery has reached full charge;

An indicator light preferably orange 66 that indicates the battery has overheated and is cooling;

An indicator light preferably red 68 that indicates the battery probably needs replacing, i.e. it is probably defective;

The use of the average characteristics of the type of batteries to be charged, i.e., the normalization of the battery voltage to one cell, so as to eliminate the need for the user to pre-set or select any charging parameters such as battery voltage or battery capacity;

The use of a magnet to assist in holding the battery in place and to provide adequate contact pressure for the required charge current, with such minimum contact pressure being at four ounces with a minimum amperage of two amperes; and The use of finger recesses in the cover of the housing so the fingers of one hand may be used to quickly and conveniently remove a battery from the pulse-charge battery charger.

I claim:

1. A pulse-charge battery charger to automatically charge batteries and especially to charge nickel-cadmium batteries to keep them free from any unwanted memory effects, and all the user must do is to place a battery in this charger and remove it per his or her convenience, and the status of the charging is known at any time by observing indicating lights, comprising:

a. a housing having a battery receiving volume, electrical contacts, and an additional volume to receive other components;

b. circuitry, inclusive of several circuits, electric and electronic components, arranged on a circuit board and installed in the housing; these several circuits and their electric and electronic components, in turn comprising:

i. a power supply circuit to receive either AC or DC low voltage power and to distribute both an unregulated voltage of full wave rectified low voltage DC power, and a regulated low voltage DC power;

ii. a U1 controller having self contained control circuits inclusive of a reset circuit;

iii. a battery installed detector circuit, detecting a battery voltage, connected to the regulated low voltage DC power of the power supply and to the U1 controller;

iv. a normalize circuit connected to the regulated low voltage DC power of the power supply and to the U1 controller to accommodate the charging of batteries having different numbers of cells;

v. a constant current source circuit connected to the unregulated DC low voltage of the power supply, the U1 controller, and the battery being charged, to insure the same constant amperage of the charging power;

vi. a discharge control circuit connected to the U1 controller, the normalize circuit, the battery installed detector circuit, and the battery being charged;

vii. a thermistor sensor circuit connected to a thermistor, the regulated low voltage DC power, and a battery overheat detection circuit, to detect whether or not a battery being charged has a built in thermistor, and if so this circuit sends a signal of any possible overheating directly from the thermistor in the battery to the battery overheat detection circuit; however, if the battery has no built in thermistor, then this circuit sends a signal of any possible overheating directly from a thermistor in this charger to the battery overheat detection circuit;

viii. the thermistor positioned directly in this charger to monitor temperatures of a battery;

ix. the battery overheat detection circuit connected to the thermistor sensor circuit, and to the regulated low voltage DC power;

x. a timing control circuit connected to the U1 controller, the regulated low voltage DC power, and a ready light circuit;

xi. the ready light circuit connected to the U1 controller, the timing control circuit, the regulated low voltage DC power, and a no battery then no light circuit;

xii. the no battery then no light circuit connected to the ready light circuit, the battery installed detector circuit, and the regulated low voltage DC power; and xiii. a reset circuit connected to the battery installed detector circuit, the U1 controller, and the regulated low voltage DC power.

2. A pulse-charge battery charger to automatically charge batteries and especially to charge nickel-cadmium batteries to keep them free from any unwanted memory effects, and all the user must do is to place a battery in this charger and remove it per his or her convenience, and the status of the charging is known at any time by observing indicating lights, comprising:

a. a housing having a battery receiving volume, electrical contacts, and an additional volume to receive other components;

b. circuitry, inclusive of several circuits, electric and electronic components, arranged on a circuit board and installed in the housing; these several circuits and their electric and electronic components, in turn comprising:

i. a power supply circuit to receive either AC or DC low voltage power and to distribute both an unregulated voltage of full wave rectified low voltage DC power, and a regulated low voltage DC power;

ii. a U1 controller having self contained control circuits inclusive of a reset circuit;

iii. a battery installed detector circuit, detecting a battery voltage, connected to the regulated low voltage DC power of the power supply and to the U1 controller;

iv. a normalize circuit connected to a battery being charged and to the U1 controller to accommodate the charging of batteries having different numbers of cells;

v. a constant current source circuit connected to the unregulated DC low voltage of the power supply, the U1 controller, and a battery being charged, to insure the same constant amperage of the charging power;

vi. a discharge control circuit connected to the U1 controller, the normalize circuit, the battery installed detector circuit, and a battery being charged;

vii. a thermistor sensor circuit connected to a thermistor, the regulated low voltage DC power, and a battery overheat detection circuit to detect whether or not a battery being charged has a built in thermistor, and if so this circuit sends a signal of any possible overheating directly from a built in thermistor in the battery to a battery overheat detection circuit; however, if a battery has no built in thermistor, then this circuit sends a signal of any possible overheating directly from a thermistor in the charger to a battery overheat detection circuit;

viii. the thermistor, positioned directly in this charger, to monitor temperatures of a battery;

ix. the battery overheat detection circuit connected to the thermistor sensor circuit, and to the regulated low voltage DC power;

x. a timing control circuit connected to the U1 controller, the regulated low voltage DC power, and a ready light circuit;

xi. the ready light circuit connected to the U1 controller, the timing control circuit, the regulated low voltage DC power, and a no battery then no light circuit;

xii. the no battery then no light circuit connected to the ready light circuit, the battery installed detector circuit, and the regulated low voltage DC power; and xiii. a reset circuit connected to the battery installed detector circuit, the U1 controller, and the regulated low voltage DC power.

3. A pulse-charge battery charger to automatically charge batteries and especially to charge nickel-cadmium batteries to keep them free from any unwanted memory effects, and all the user must do is to place a battery in this charger and remove it per his or her convenience, and the status of the charging is known at any time by observing indicating lights, comprising:

a. a housing having a battery receiving volume, electrical contacts, and an additional volume to receive other components;

b. circuitry, inclusive of several circuits, electric and electronic components, arranged on a circuit board and installed in the housing; these several circuits and their electric and electronic components, in turn comprising:

i. a power supply circuit to receive either AC or DC low voltage power and to distribute both an unregulated voltage of full wave rectified low voltage DC power, and a regulated low voltage DC power;

ii. a U1 controller having self contained control circuits inclusive of a reset circuit;

iii. a battery installed detector circuit, detecting a battery voltage, connected to the regulated low voltage DC power of the power supply and to the U1 controller;

iv. a normalize circuit connected to a battery being charged and to the U1 controller, to accommodate the charging of batteries having different numbers of cells;

v. a constant current source circuit connected to the unregulated DC low voltage of the power supply, the U1 controller, and the battery being charged, to insure the same constant amperage of the charging power;

vi. a discharge control circuit connected to the U1 controller, the normalize circuit, the battery installed detector circuit, and the battery being charged;

vii. a thermistor sensor circuit connected to a thermistor, the regulated low voltage DC power, and a battery overheat detection circuit;

viii. the thermistor, positioned directly in this charger, to monitor temperatures of a battery;

ix. a battery overheat detection circuit connected to the thermistor sensor circuit, and to the regulated low voltage DC power, and this circuit includes both a negative temperature coefficient temperature circuit portion, which has a U2A unit, and a positive temperature coefficient temperature sensor detection circuit portion, which has a U2B unit, and the U2A unit and the U2B unit are operational amplifiers, used as respective comparitors, which compare two voltage signals without doing anything to the balance of this circuitry, while determining which voltage signal is greater;

x. a timing control circuit connected to the U1 controller, the regulated low voltage DC power, and a ready light circuit;

xi. the ready light circuit connected to the U1 controller, the timing control circuit, the regulated low voltage DC power, and a no battery then no light circuit;

xii. the no battery then no light circuit connected to the ready light circuit, the battery installed detector circuit, and the regulated low voltage DC power; and xiii. a reset circuit connected to the battery installed detector circuit, the U1 controller, and the regulated low voltage DC power.

4. A pulse-charge battery charger to automatically charge batteries and especially to charge nickel-cadmium batteries to keep them free from any unwanted memory effects, and all the user must do is to place a battery in this charger and remove it per his or her convenience, and the status of the charging is known at any time by observing indicating lights, comprising:

a. a housing having a battery receiving volume, electrical contacts, and an additional volume to receive other components;

b. circuitry, inclusive of several circuits, electric and electronic components, arranged on a circuit board and installed in the housing; these several circuits and their electric and electronic components, in turn comprising:

i. a power supply circuit to receive either AC or DC low voltage power and to distribute both an unregulated voltage of full wave rectified low voltage DC power, and a regulated low voltage DC power;

ii. a U1 controller having self contained control circuits inclusive of a reset circuit;

iii. a battery installed detector circuit, detecting a battery voltage, connected to the regulated low voltage DC power of the power supply and to the U1 controller;

iv. a normalize circuit connected to a battery being charged and to the U1 controller to accommodate the charging of batteries having different numbers of cells;

v. a constant current source circuit connected to the unregulated DC low voltage of the power supply, the U1 controller, and the battery being charged, to insure the same constant amperage of the charging power;

vi. a discharge control circuit connected to the U1 controller, the normalize circuit, the battery installed detector circuit, and the battery being charged;

vii. a thermistor sensor circuit connected to a thermistor, the regulated low voltage DC power, and a battery overheat detection circuit;

viii. the thermistor, positioned directly in this charger, to monitor temperatures of a battery;

ix. the battery overheat detection circuit connected to the thermistor sensor circuit, and to the regulated low voltage DC power;

x. a timing control circuit connected to the U1 controller, the regulated low voltage DC power, and a ready light circuit;

xi. the ready light circuit connected to the U1 controller, the timing control circuit, the regulated low voltage DC power, and a no battery then no light circuit, and this ready light circuit has both a green light and a driver circuit thereof, and when necessary, this driver circuit is isolated by using capacitor C2, a CR5 diode, and resistors R7 and R8;

xii. the no battery then no light circuit connected to the ready light circuit, the battery installed detector circuit, and the regulated low voltage DC power; and xiii. a reset circuit connected to the battery installed detector circuit, the U1 controller, and the regulated low voltage DC power.

5. A pulse-charge battery charger, as claimed in claims 1, 2, 3, or 4, having a magnet positioned in the housing, and the magnetic field of the magnet creates a magnetic force which holds a battery and terminals thereof, in place in the battery receiving volume, with sufficient force to keep battery terminals in firm abutment with the electrical contacts of the housing of the charger.

* * * * *